(12) United States Patent
Suyama

(10) Patent No.: US 6,213,510 B1
(45) Date of Patent: Apr. 10, 2001

(54) OCCUPANT RESTRAINT APPARATUS AND METHOD OF CONTROLLING OCCUPANT RESTRAINT APPARATUS

(75) Inventor: Kouichi Suyama, Utsunomiya (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/444,452

(22) Filed: Nov. 22, 1999

(30) Foreign Application Priority Data

Nov. 27, 1998 (JP) .................................................. 10-337925

(51) Int. Cl.[7] ........................... B60R 21/01; B60R 22/28; B60R 22/36
(52) U.S. Cl. .............................. 280/805; 280/806; 701/45
(58) Field of Search ................................. 280/805, 806; 180/268; 701/45

(56) References Cited

U.S. PATENT DOCUMENTS 5,531,479 * 7/1996 Bauer .................................. 280/805
5,544,918 * 8/1996 Fleming et al. ..................... 280/805
5,573,269   11/1996 Gentry et al. .
5,664,807    9/1997 Bohmler .

FOREIGN PATENT DOCUMENTS 7-186880   7/1995 (JP) .
8-127313   5/1996 (JP) .
8-268224  10/1996 (JP) .

* cited by examiner

Primary Examiner—Peter English

(57) ABSTRACT

When an impact energy absorbing mechanism on a vehicle is in operation, a paid-out length of a seat belt is detected by a displacement sensor, and a paid-out speed of the seat belt is calculated by a paid-out speed calculating unit. Based on speed information from a speed sensor, a vehicle speed detecting unit calculates a speed of the vehicle with respect to a ground surface on which the vehicle runs. Then, an occupant acceleration calculating unit calculates an acceleration of an occupant with respect to the ground surface from the calculated paid-out speed and the calculated speed of the vehicle. Impact forces applied to the occupant can be reduced simply and highly accurately irrespectively of the weight of the occupant and whether an air bag is installed in the vehicle or not.

26 Claims, 25 Drawing Sheets

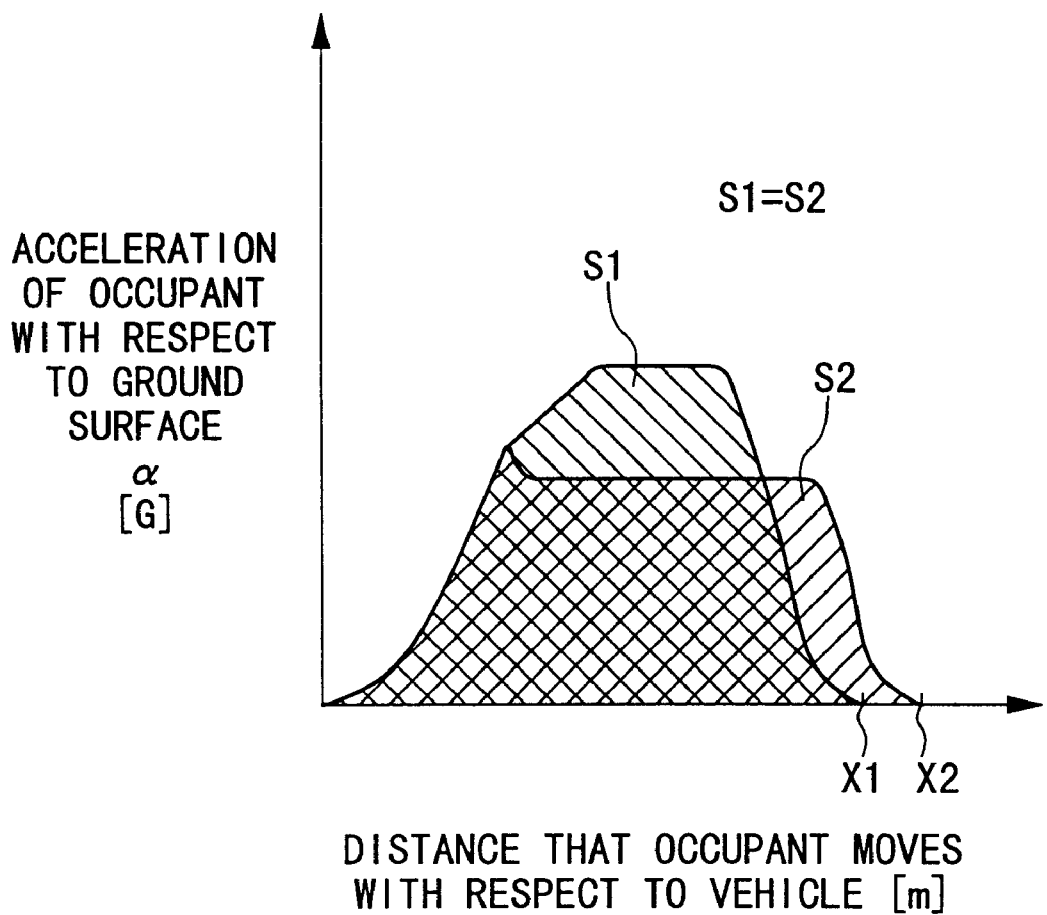

OCCUPANT RESTRAINT APPARATUS AND METHOD OF CONTROLLING OCCUPANT RESTRAINT APPARATUS

BACKGROUND OF THE INVENTION

1. Field of the Invention

The present invention relates to an occupant restraint apparatus having an impact energy absorbing mechanism for restraining an occupant while preventing a seat belt from being paid out in an emergency and allowing the seat belt to be paid out when a load in excess of a preset load is applied to the occupant, and a method of controlling such an occupant restraint apparatus.

2. Description of the Related Art

Generally, occupant restraint apparatus such as seat belt apparatus are effective to protect vehicle occupants against injury upon collision of the vehicle. For example, a seat belt apparatus has an emergency locking retractor (hereinafter referred to as an "ELR") for winding back a seat belt known as a webbing around a take-up shaft under spring forces and preventing the seat belt from being paid out in order to restrain an occupant when subjected to a collision-induced impact.

When the seat belt is prevented from being paid out by the ELR, since the occupant is abruptly retrained against forward movement, the occupant suffers from an impact force imposed via the seat belt. In order to reduce such an impact force applied to the occupant, there has been employed an impact energy absorbing mechanism (hereinafter referred to as an "EA mechanism") for paying out the seat belt while keeping the seat belt under a predetermined webbing tension (hereinafter referred to as an "EA load") thereby to absorb impact energy acting on the occupant when a load in excess of a preset load acts on the seat belt after the seat belt is locked by the ELR, as disclosed in Japanese laid-open patent publication No. 8-127313, for example.

As indicated by an equation of motion: Fs (restraint force)=m (mass of the occupant)×α (acceleration or deceleration), if the mass of the occupant, i.e., the weight of the occupant, differs under a constant EA load, then the acceleration (deceleration or impact) applied to the occupant upon vehicle collision also differs as shown in FIG. 20 of the accompanying drawings. Japanese laid-open patent publication No. 8-268224 discloses a technique for varying the EA load by making mechanical adjustments to meet the weight of the occupant. The disclosed arrangement is disadvantageous in that making mechanical adjustments for an occupant other than the vehicle's driver is tedious and time-consuming because such an occupant cannot usually be specified and new mechanical adjustments need to be made each time they change.

Japanese laid-open patent publication No. 7-186880 reveals a system for controlling an occupant restraint apparatus by measuring the weight of an occupant with a weight sensor and a tilt sensor. The revealed system is, however, constructed of a large number of parts and considerably expensive due to a complex corrective logic because the difference between the detected weight of the occupant and the actual weight of the occupant is compensated for in view of the manner in which the occupant is seated on the seat cushion and the angle of the seatback.

Another problem is that increased restraint forces are applied to an occupant when an air bag is inflated. More specifically, as shown in FIG. 21 of the accompanying drawings, even if an acceleration α of the occupant caused with respect to the ground surface (corresponding to an impact force on the occupant) upon a collision of the vehicle is to be kept constant at a time t0 by paying out the seat belt under the constant EA load, when the air bag is inflated at a time t1, the acceleration α of the occupant with respect to the ground surface tends to increase due to restraint forces of the air bag.

There is known a process of adjusting the length by which the seat belt is paid out to-reduce the EA load when the EA mechanism is operated, as disclosed in Japanese laid-open patent publications Nos. 8-127313 and 8-268224, for example (see FIG. 22 of the accompanying drawings). According to the disclosed process, the paid-out length of the seat belt for reducing the EA load is set to a predetermined value L'1 which is uniquely fixed and cannot be varied.

The position of an occupant seated on the seat cushion in the longitudinal direction of the vehicle, i.e., the position of the seat slide, varies from body shape to body shape. As a result, as indicated at in FIG. 22, the relative inflating timing of the air bag ① thorough ③ is varied. As shown in FIG. 23 of the accompanying drawings, the acceleration α of the occupant with respect to the ground surface varies depending on the position of the seat slide, resulting in an unstable occupant restraining capability.

In the EA mechanism, as shown in FIG. 24 of the accompanying drawings, even if a retractor 2 keeps the webbing tension (EA load) Ts at a constant level, as an occupant 3 moves forward, a belt restraint force Fs acting on the occupant 3 increases. The belt restraint force Fs acting on the occupant 3 is related to the webbing tension Ts by Fs=Ts cosθs. As the occupant 3 moves forward from the solid-line position to the two-dot-and-dash-line position in FIG. 24, the angle θs at which the webbing tension Ts acts becomes acuter, increasing the belt restraint force Fs (see FIG. 25 of the accompanying drawings). FIG. 25 shows a cross section along the seat belt over the occupant 3 shown in FIG. 4.

Therefore, as shown in FIG. 26 of the accompanying drawings, even if the webbing tension Ts is kept at a constant level by the retractor 2, the belt restraint force Fs acting on the occupant 3 increases as the occupant 3 moves forward.

Therefore, as indicated by the equation Fs=m·α (m: mass of the occupant 3 and α: acceleration or deceleration on the chest of the occupant 3), the acceleration or deceleration α on the chest of the occupant 3, i.e., the impact force increases in proportion to the belt restraint force Fs as the occupant 3 moves forward (see FIG. 27 of the accompanying drawings).

FIGS. 28 and 29 of the accompanying drawings show the belt restraint force Fs acting on an occupant, represented by the vertical axis as it is related to the displacement x' of the occupant, represented by the horizontal axis, according to Fs=m·α, for the purpose of considering energy absorbing efficiency.

Even if the webbing tension Ts is kept constant by the retractor 2, since the belt restraint force Fs is not constant due to variations in the webbing tension angle θs, when the EA mechanism is in its initial stage of operation, a dead zone where the EA mechanism does not work due to the difference between the maximum restraint forces and the restraint forces during movement of the occupant 3 is created as shown hatched in FIG. 28 of the-accompanying drawings, resulting in a poor efficiency for absorbing the impact energy.

Theoretically, insofar as the belt restraint force Fs is constant, the impact energy can effectively be absorbed from the initial stage of operation of the EA mechanism, making it possible to reduce the maximum restraint forces and the maximum deceleration, i.e., the impact force, as indicated by the dot-and-dash line in FIG. 29.

However, when the belt restraint force Fs acting on the occupant 3 is constant, the webbing tension Ts needs to be reduced depending on the paid-out length of the webbing during operation of the EA mechanism, in view of changes in the webbing tension angle θs upon forward movement of the occupant 3, as indicated by the dot-and-dash line in FIG. 26.

SUMMARY OF THE INVENTION

It is an object of the present invention to provide an occupant restraint apparatus capable of simply and highly accurately reducing an impact force applied to an occupant without being affected by the weight of the occupant and reactive forces from an air bag, and a method of controlling such an occupant restraint apparatus.

When a seat belt in a vehicle is elongated under a webbing load in an emergency, since a maximum webbing load is approximately equal to an EA load, the elongation of the seat belt is regarded as being substantially not caused at the time an impact energy absorbing mechanism (EA mechanism) is operated. If the EA mechanism has a seat belt clamp mechanism, then the webbing is not wound tightly around the bobbin of a retractor. When the EA mechanism is in operation, a paid-out length of the seat belt is approximately equal to the distance that an occupant moves with respect to the vehicle.

In an occupant restraint apparatus and a method of controlling same according to the present invention, a paid-out length of the seat belt at the time the EA mechanism is operated is detected, and a paid-out speed of the seat belt, which is a time-dependent rate of change of the paid-out length of the seat belt, or a paid-out acceleration of the seat belt is calculated as a speed or acceleration of the occupant with respect to the vehicle. A speed or acceleration of the vehicle with respect to a ground surface on which the vehicle runs is obtained, and an acceleration acting on the occupant with respect to the ground surface is calculated (estimated).

If the principles of the present invention are applied to a collision test, it is possible to estimate accurately and easily the acceleration of the occupant in an emergency, which has heretofore been difficult to measure. By controlling the occupant restraint apparatus based on the estimate acceleration, it is possible to reliably set up a restraining state suitable for details of the collision.

According to the present invention, the seat belt is folded back by a shoulder anchor, and the relationship between the paid-out length of the seat belt and the distance that the occupant moves can be regarded as the relationship between a change in the hypotenuse of a hypothetical triangle which is pulled out from the shoulder anchor and a change in the base of the hypothetical triangle which extends horizontally (see FIG. 24 of the accompanying drawings). As the occupant moves, the angle between the hypotenuse and the base (webbing tension angle θs) changes. The webbing tension angle θs becomes acuter as the occupant moves forward a greater distance.

While the paid-out length of the seat belt and the distance that the occupant moves are strictly not in one-to-one correspondence, the distance that the occupant moves can accurately be estimated from the paid-out length of the seat belt by detecting a paid-out direction (angle) of the seat belt and correcting the distance that the occupant moves with the detected paid-out direction (angle). The accuracy with which to estimate the acceleration of the occupant with respect to the ground surface is effectively increased.

If the above estimated acceleration is applied to the control of the occupant restraint apparatus, then since the EA load is directly controlled in a feedback loop so as to keep constant the acceleration of the occupant with respect to the ground surface which is assumed to represent the relationship between the change in the hypotenuse of the hypothetical triangle and the change in the base of the hypothetical triangle, the occupant can be restrained under more suitable conditions. Stated otherwise, even when the webbing tension angle θs becomes acuter due to a different occupant's weight or as the occupant moves forward (restraint force (Fs)=seat belt tension (Ts)×cos(θs), Fs=mass (m)× acceleration (α)), the restraint force or impact force acting on the occupant does not increase.

According to the present invention, furthermore, the acceleration acting on the occupant with respect to the ground surface is directly estimated based on the paid-out length of the seat belt when the EA mechanism is in operation, and the load imposed on the paying-out of the seat belt by the EA mechanism, i.e., the EA load, is controlled in a feedback loop. The acceleration acting on the occupant with respect to the ground surface can therefore be maintained at a constant level irrespectively of different occupant weights, the collision details, and whether or not an air bag is installed or not, for thereby making it possible to efficiently absorb the collision energy. Therefore, the occupant can be restrained in optimum conditions at all times.

By estimating a differential with respect to time of the acceleration of the occupant with respect to the ground surface, it is possible to predict the tendency of the collision for varying the load on the paying-out of the seat belt more appropriately thereby to restrain the occupant in better conditions.

Furthermore, it is possible to reliably detect a time at which the air bag is inflated by supplying an air bag inflation signal. Consequently, an increase in the restraint force of the air bag can be predicted to control the EA load, and the air bag is caused to effectively bear the restraint force against forward movement of the occupant to keep accurately at a constant level the acceleration of the occupant with respect to the ground surface.

According to the present invention, moreover, the distance between the occupant and a vehicle component positioned in front of the occupant, i.e., the distance that the occupant can move forward, is predicted from the position of the occupant in a longitudinal direction of the vehicle, which is detected by an occupant position detecting means. The EA load or the EA load and the paid-out length of the seat belt during operation of the EA mechanism are controlled further in view of a distance that the occupant moves with respect to the vehicle, estimated based on the paid-out length of the seat belt which is detected by a seat-belt paid-out length detecting means. Therefore, when the distance that the occupant can move forward is large, the impact force applied to the occupant can be reduced by setting the EA load to a low level. Accordingly, the occupant can be restrained under more appropriate conditions in view of the position in which the occupant is seated.

According to the present invention, furthermore, the direction in which the vehicle moves, i.e., the direction in which the occupant moves with respect to the vehicle, is determined from the direction in which an acceleration acts on the vehicle in an emergency, and the distance between the occupant and a vehicle component in the above direction in which the occupant moves with respect to the vehicle, i.e., the distance that the occupant can move, is predicted from the determined direction. Then, the EA load or the EA load and the paid-out length of the seat belt during operation of the EA mechanism are controlled. Accordingly, the occupant can be restrained under more appropriate conditions in view of the collision details.

The above and other objects, features, and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 15 is a diagram showing the relationship between the distances $X_1$, $X_2$ and the acceleration of the occupant with respect to the ground surface;

DESCRIPTION OF THE PREFERRED EMBODIMENTS

Figure 1:
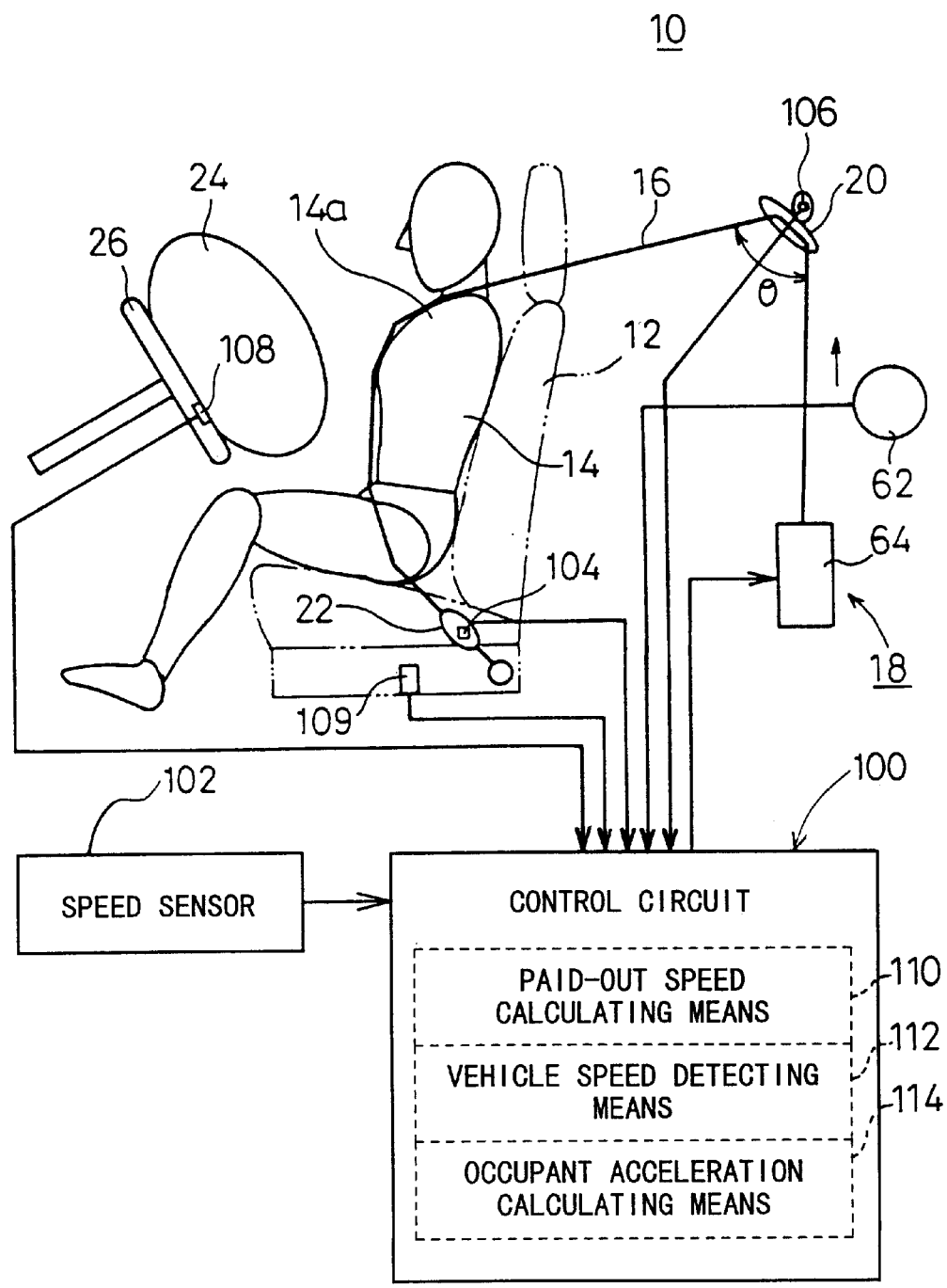
FIG. 1 is a schematic view, partly in block form, a seat belt apparatus according to a first embodiment of the present invention.

FIG. 1 schematically shows, partly in block form, a seat belt apparatus 10 as an occupant restraint apparatus according to a first embodiment of the present invention.

As shown in FIG. 1, the seat belt apparatus 10 has a seat belt (webbing) 16 for protecting an occupant 14 seated on a seat 12. The seat belt 16, which is paid out from an ELR 18, extends via a shoulder anchor 20 over a shoulder 14a of the occupant 14 to a buckle 22 fixed to a base of the seat 12 and is detachably connected to the buckle 22. The seat belt apparatus 10 is installed in a vehicle, typically an automobile, which has a steering wheel 26 incorporating an air bag 24 and positioned in front of the occupant, who is the driver of the vehicle.

Figure 2:
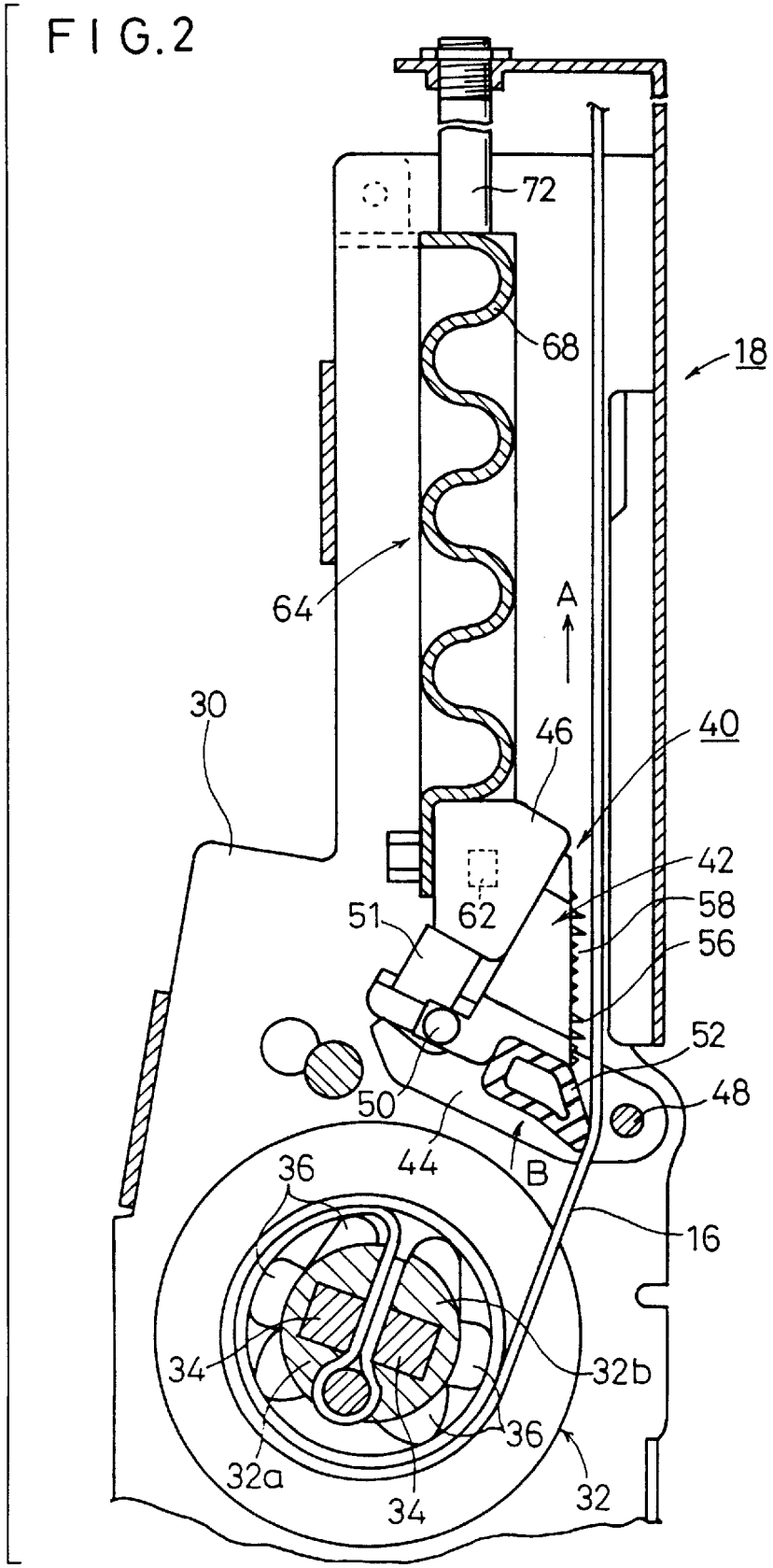
FIG. 2 is a vertical cross-sectional view of an ELR of the seat belt apparatus.

As shown in FIG. 2, the ELR 18 has a retractor base 30 in which a bobbin 32 with the seat belt 16 wound therearound is rotatably supported. The bobbin 32 is rotatable with a take-up shaft 34 which is combined with a take-up spring (not shown) for biasing the bobbin 32 to turn in a direction to wind the seat belt 16 around the bobbin 32. The bobbin 32 has a pair of barrel members 32a, 32b which support on their outer circumferential surfaces a plurality of ribs 36 that are plastically deformable under a load applied by the seat belt 16 to reduce the diameter of the take-up shaft 34 and pay out the seat belt 16.

The ELR 18 has a clamp mechanism 40 as an EA mechanism for clamping the seat belt 16 in an emergency to restrain the occupant 14 and paying out the seat belt 16 when a load in excess of a predetermined load is applied to the seat belt 16. The clamp mechanism 40 comprises a clamp member 42 for being pressed against the seat belt 16 to hold the seat belt 16, a clamp lever 44 for holding the clamp member 42 to move the clamp member 42 in an emergency, and an upper plate 46 for limiting the range of movement of the clamp member 42 when the clamp lever 44 moves the clamp member 42.

The clamp lever 44 is angularly movably supported on the retractor base 30 by a shaft 48, and has a distal end holding a pivot shaft 50 on the clamp member 42. The clamp lever 44 is operatively linked to the ELR 18. When the ELR 18 prevents the bobbin 32 from rotating in a direction to pay out the seat belt 16 in an emergency, the clamp lever 44 presses the clamp member 42 against the seat belt 16 to prevent the seat belt 16 from being paid out.

Figure 3:
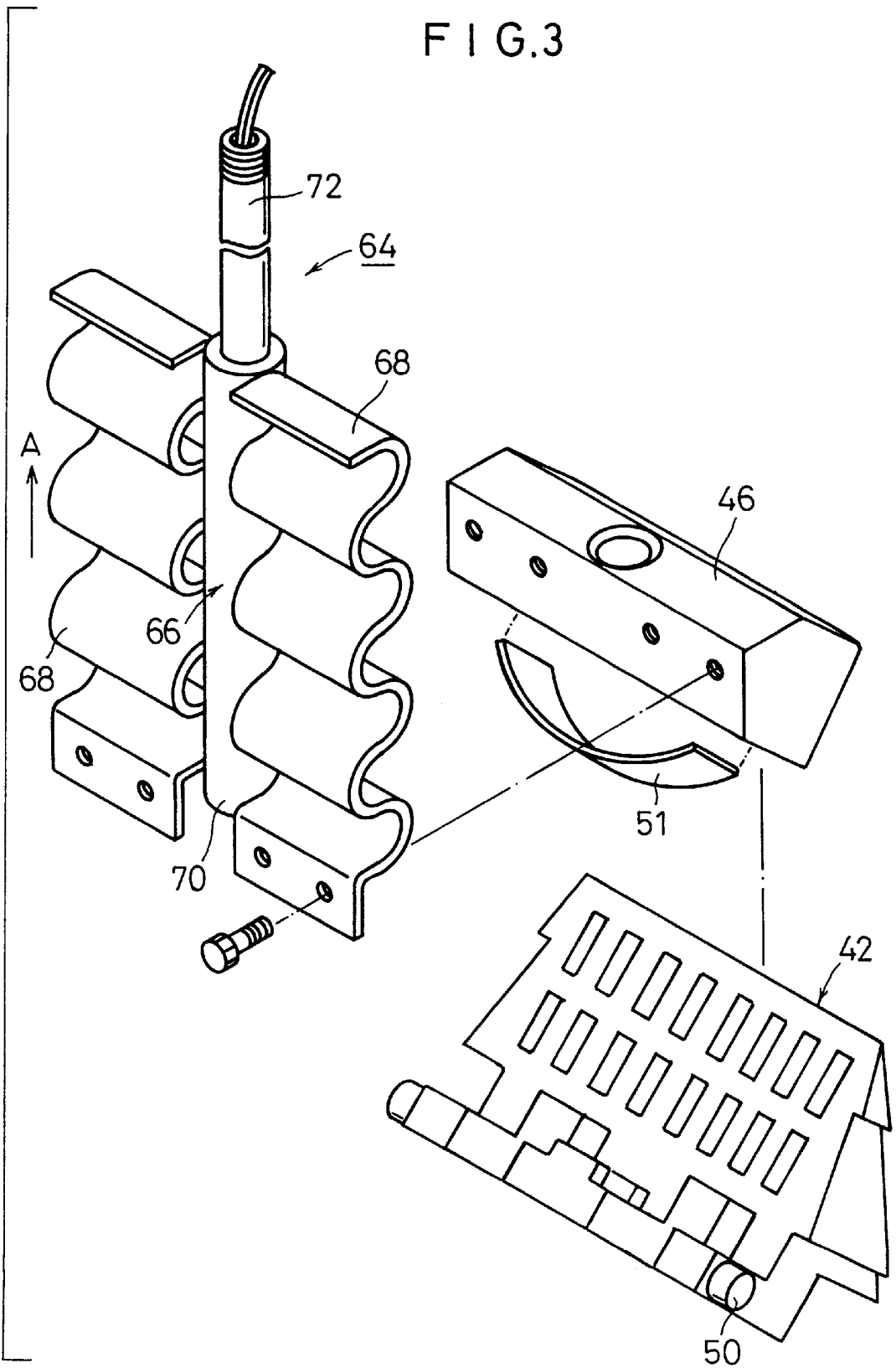
FIG. 3 is an exploded perspective view of a variable load applying means incorporated in the ELR.

The clamp lever 44 is normally biased in a direction opposite to the direction indicated by the arrow B by a return spring 51 disposed behind the upper plate 46 in order to keep the seat belt 16 out of contact with the clamp member 42, as shown in FIGS. 2 and 3. The clamp lever 44 has a joint 52 for setting up the position to pay out the seat belt 16 from the bobbin 32. The clamp member 42 has a predetermined number of first engaging teeth 56 with sharp tip ends and a predetermined number of second engaging teeth 58 with flat tip ends, the first and second engaging teeth 56, 58 being disposed on a surface of the clamp member 42 which faces the seat belt 16.

On the upper plate 46, there is mounted a displacement sensor (length detecting means) 62 for detecting a displacement of the upper plate 46 when the upper plate 46 moves in unison with the seat belt 16, i.e., a length of the seat belt 16 which is paid out when the EA mechanism is operated. The displacement sensor 62 comprises, for example, an electrostatic capacitance sensor for determining a displacement of a movable electrode from a change in an electrostatic capacitance which is caused by the displacement of the movable electrode.

The clamp mechanism 40 has a variable load applying means 64 for varying the load imposed on the paying-out of the seat belt 16 by the clamp mechanism 40. The variable load applying means 64 comprises a hydraulic damper 66 and a pair of plastically deformable strips 68 disposed one on each side of the hydraulic damper 66. The plastically deformable strips 68 are corrugated into successive wavy elements along the direction indicated by the arrow A in which the seat belt 16 is paid out. The plastically deformable strips 68 have upper ends fastened to the retractor base 30 by screws and lower ends fastened to the upper plate 46 by screws. The plastically deformable strips 68 function as a fail-safe mechanism for keeping a minimum EA load.

Figure 4:
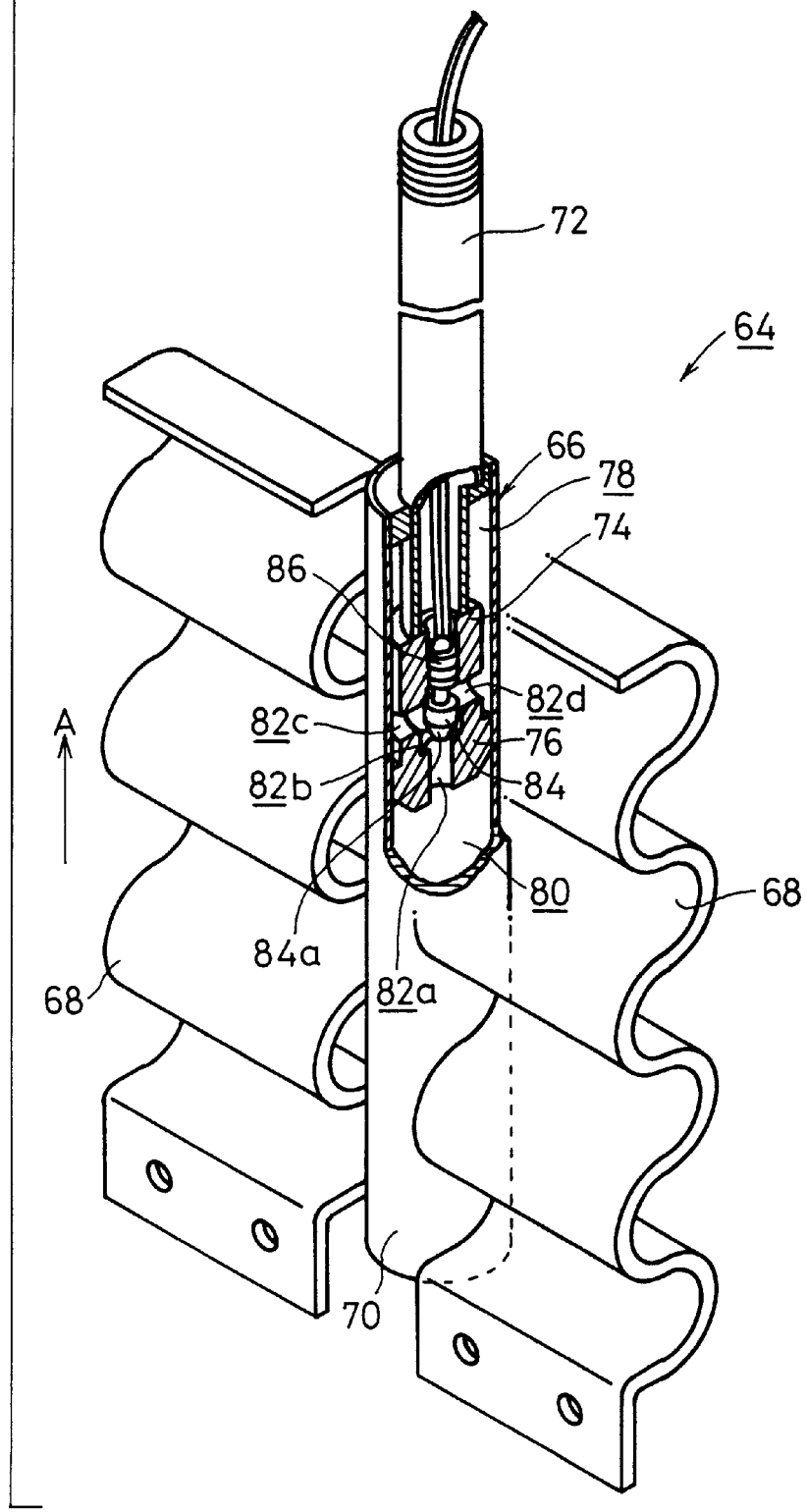
FIG. 4 is a perspective view, partly cut away, of the variable load applying means.

As shown in FIGS. 3 and 4, the hydraulic damper 66 has a cylinder tube 70 oriented in direction indicated by the arrow A, and a piston rod 72 axially movably disposed in the cylinder tube 70 and projecting upwardly from an upper open end of the cylinder tube 70. The piston rod 72 has an upper end fixed to the retractor base 30 and a lower end connected to a cylindrical stepped sleeve 74 with a piston 76 integrally fixed to the lower end thereof. The piston 76 which is slidably fitted in the cylinder tube 70 divides the interior of the cylinder tube 70 into an upper hydraulic chamber 78 and a lower hydraulic chamber 80.

As shown in FIG. 4, the sleeve 74 has hydraulic passages 82a through 82d defined therein which provide fluid communication between the upper hydraulic chamber 78 and the lower hydraulic chamber 80. The hydraulic passages 82a through 82d jointly serve as an orifice. A cylindrical orifice member 84 is vertically movably disposed in the hydraulic passage 82b and has a tapered lower end 84a. The cylindrical orifice member 84 is mechanically connected at an upper end thereof to a piezoelectric device 86. When the piezoelectric device 86 is actuated, the constriction of the orifice which is defined between the tapered lower end 84a and an inner circumferential wall surface of the hydraulic passage 82b is continuously variable.

As shown in FIG. 1, the variable load applying means 64 and the displacement sensor 62 are electrically connected to a control circuit 100. A vehicle speed sensor 102 and a seat belt sensor 104 are also electrically connected to the control circuit 100. The shoulder anchor 20 is combined with an encoder (angle detecting means) 106 for detecting a seat belt paid-out angle $\theta$, which is an angle between the portion of the seat belt 16 which extends from the shoulder anchor 20 to the occupant 14 and a line normal to the ground surface on which the vehicle runs. The encoder 106 is also electrically connected to the control circuit 100. The steering wheel 26 has an air bag operation sensor 108 as an air bag operation detecting means for detecting operation of the air bag 24. The air bag operation sensor 108 is electrically connected to the control circuit 100. The seat 12 is associated with a seat position detector 109 for detecting the position of the occupant 14 seated on the seat 12 within the cabin of the vehicle. The seat position detector 109 is electrically connected to the control circuit 100.

The control circuit 100 functions as a paid-out speed calculating means 110 for calculating a paid-out speed of the seat belt 16 from a paid-out length of the seat belt 16 detected by the displacement sensor 62, a vehicle speed detecting means 112 for calculating a speed of the vehicle with respect to the ground surface from a vehicle speed detected by the vehicle speed sensor 102, and an occupant acceleration calculating means 114 for calculating an acceleration of the occupant 14 with respect to the ground surface from the paid-out speed calculated by the paid-out speed calculating means 110 and the speed of the vehicle calculated by the vehicle speed detecting means 112. An initial setting of the EA load is established by an initial valve position of the hydraulic damper 66 and a yield load of the plastically deformable strips 68.

Figure 5:
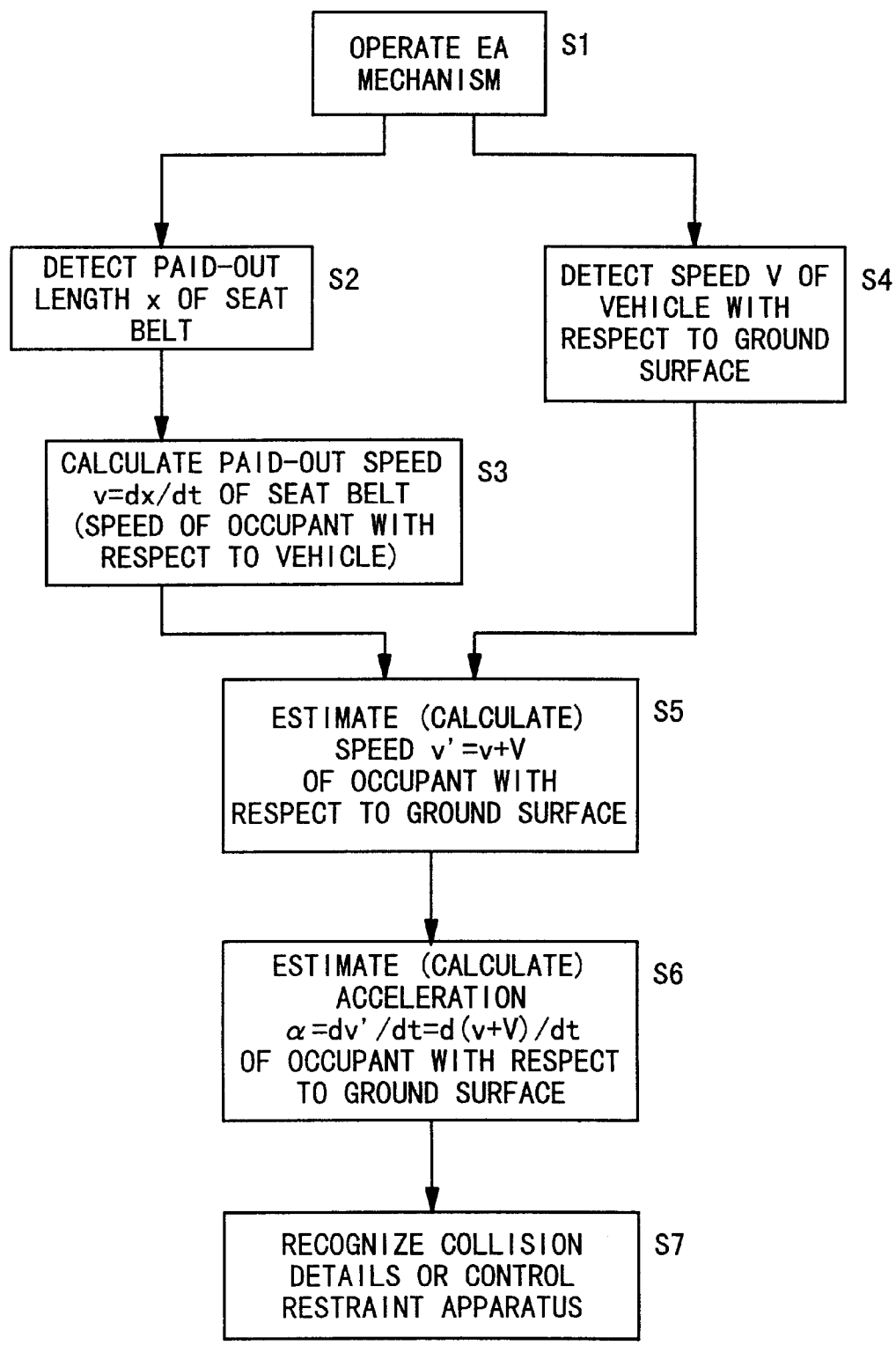
FIG. 5 is a flowchart of an operation sequence of a method of controlling the seat belt apparatus according to the first embodiment.

Operation of the seat belt apparatus 10 of the above construction will be described below with reference to FIG. 5 which shows an operation sequence of a method of controlling the seat belt apparatus 10 according to the first embodiment.

Figure 6A:
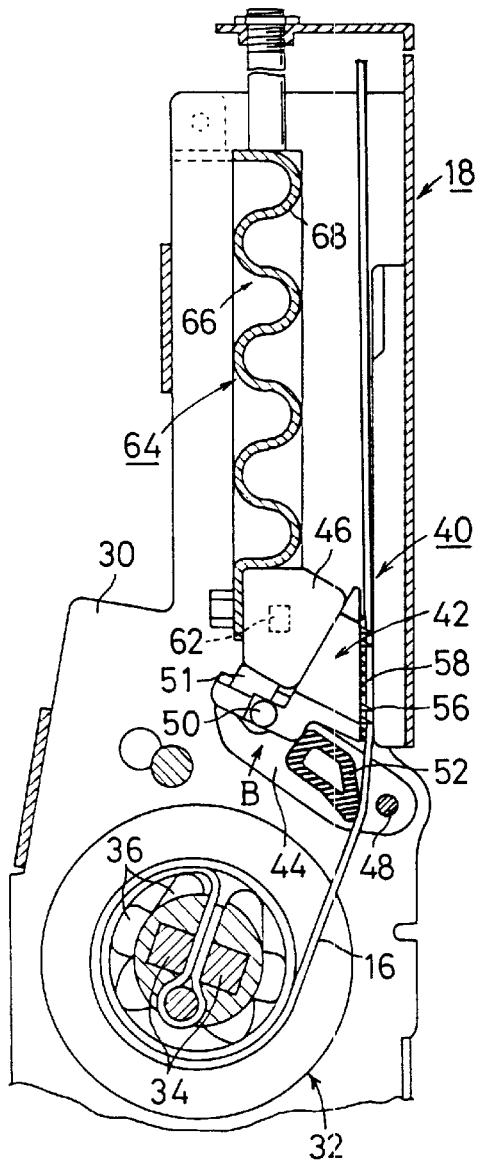
FIG. 6A is a vertical cross-sectional view of the ELR with a clamp mechanism actuated.

When the vehicle is abruptly decelerated by a collision, for example, the bobbin 32 is prevented from rotating by an emergency lock mechanism (not shown). The clamp lever 44 is angularly moved in the direction indicated by the arrow B, pushing out the clamp member 42 along a lower surface of the upper plate 46. The clamp member 42 is pressed against the seat belt 16 against the bias of the return spring 51, holding the seat belt 16 with the first and second engaging teeth 56, 58 (see FIG. 6A).

After the seat belt 16 is clamped against being paid out by the clamp mechanism 40, the load acting on the seat belt 16 in the paid-out direction indicated by the arrow A increases progressively. When the load acting on the seat belt 16 in the paid-out direction reaches a preset load, the successive wavy elements of the plastically deformable strips 68 collapse in the paid-out direction, and the hydraulic damper 66 is compressed to allow the clamp member 42 to move in unison with the seat belt 16 in the paid-out direction indicated by the arrow A (step S1 in FIG. 5). After the seat belt 16 is clamped against being paid out by the clamp mechanism 40, the seat belt 16 is elongated under the load acting on the seat belt 16. Since the EA load is approximately equal to the maximum load acting on the seat belt 16, the seat belt 16 is not elongated when the EA mechanism is in operation.

Figure 6B:
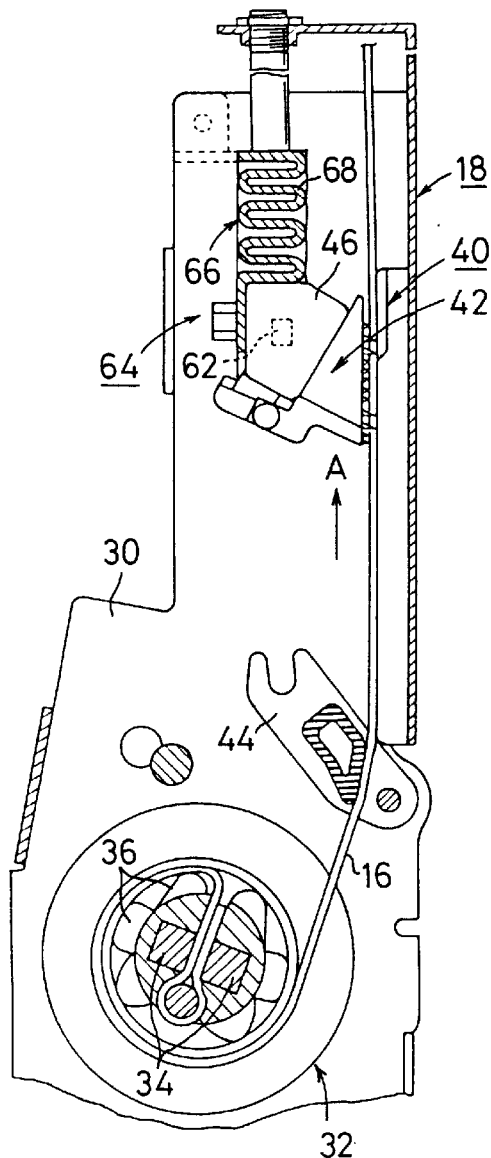
FIG. 6B is a vertical cross-sectional view of the ELR with the clamp mechanism pulled out together with a seat belt.

As shown in FIG. 6B, when the clamp member 42 moves in the paid-out direction indicated by the arrow A, the displacement sensor 62 mounted on the upper plate 46 detects a displacement of the upper plate 46, i.e., a paid-out length x of the seat belt 16 when the EA mechanism is in operation (step S2). The detected paid-out length x is supplied to the control circuit 100, which functions as the paid-out speed calculating means 110 to calculate a paid-out speed v (v=dx/dt) of the seat belt 16 (step S3).

The control circuit 100 is also supplied with a vehicle speed from the vehicle speed sensor 102. The control circuit 100 functions as the vehicle speed detecting means 112 to detect a speed V of the vehicle with respect to the ground surface (step S4). Then, the control circuit 100 calculates a speed V' (V'=v+V) of the occupant 14 with respect to the ground surface based on the paid-out speed v of the seat belt 16 with respect to the vehicle and the speed V of the vehicle with respect to the ground surface (step S5). Then, control goes to step S6 in which the control circuit 100 calculates an acceleration α (α=dv'/dt=d(v+V)/dt) of the occupant 14 with respect to the ground surface when the EA mechanism is in operation. Then, control proceeds to step S7 in which the control circuit 100 recognizes the collision details or the variable load applying means 64 varies the load imposed on the paying-out of the seat belt 16 by the clamp mechanism 40 as the EA mechanism, based on the calculated acceleration α of the occupant 14 with respect to the ground surface. Specifically, the control circuit 100 actuates the piezoelectric device 86 of the hydraulic damper 66 to vertically move the orifice member 84 to adjust the constriction of the orifice. In this manner, the damping coefficient of the hydraulic damper 66 can be changed continuously.

In the first embodiment, as described above, when the EA mechanism is in operation, the paid-out length x of the seat belt 16 is detected, and the acceleration α of the occupant 14 with respect to the ground surface is calculated on the basis of the paid-out length x and the speed V of the vehicle with respect to the ground surface. Then, based on the calculated acceleration α of the occupant 14 with respect to the ground surface, the variable load applying means 64 varies the load imposed on the paying-out of the seat belt 16 by the clamp mechanism 40 as the EA mechanism.

Figure 7:
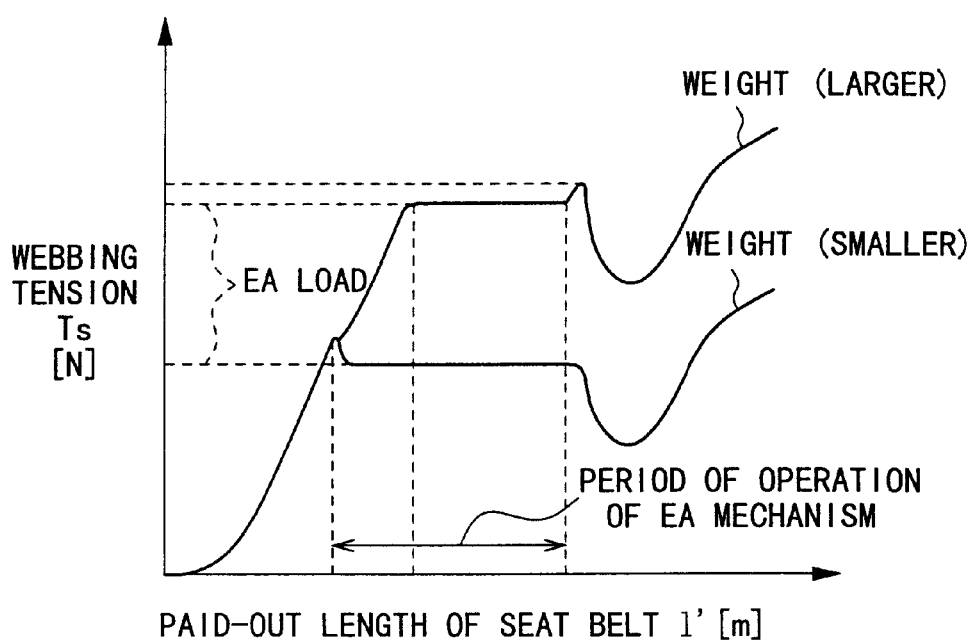
FIG. 7 is a diagram showing the relationship between the webbing tension and the seat belt paid-out length at different body weights.
Figure 8:
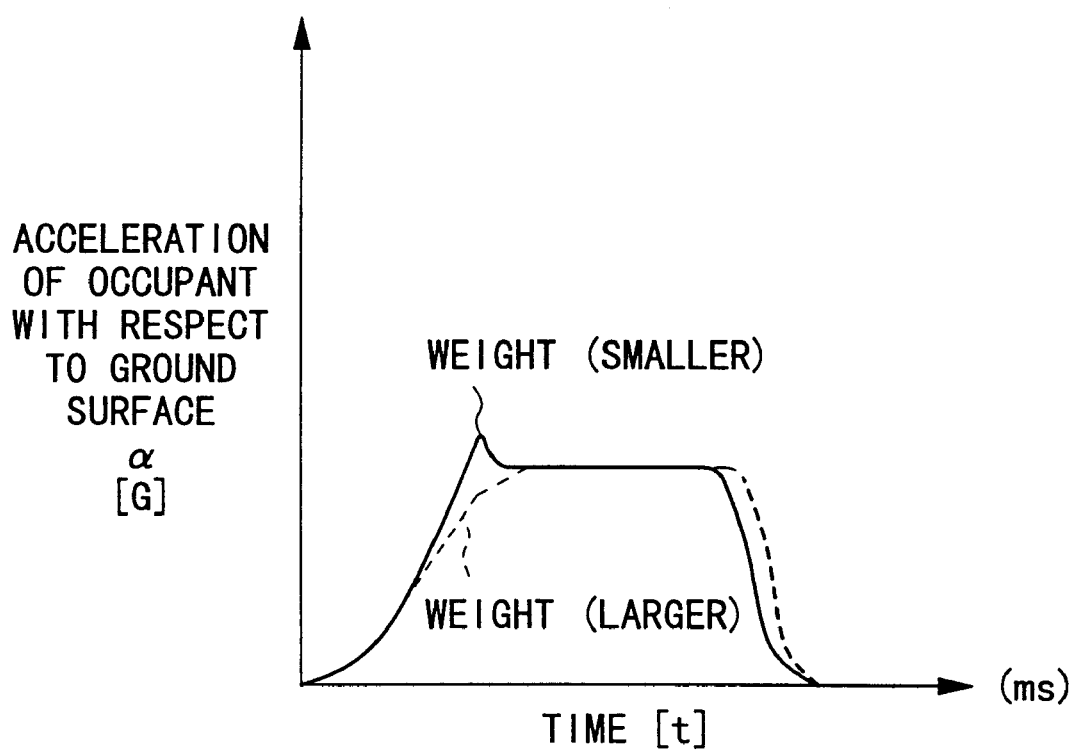
FIG. 8 is a diagram showing the relationship between the acceleration of occupants of different weights with respect to the ground surface and time.

Consequently, the acceleration α of the occupant 14 can be controlled in a certain range without being affected by the weight difference between different occupants, making it possible to reduce an impact force optimally. Specifically, an impact force acting on the occupant 14, i.e., an acceleration of the occupant 14 with respect to the ground surface, is directly estimated (calculated), and the EA load is varied on the basis of the estimated impact force or acceleration. Therefore, even if different occupants 14 have different weights, the webbing tension (EA load) acting on the occupant 14 is set up depending on the weight of the occupant 14 (see FIG. 7). Therefore, it is possible to establish a constant acceleration (impact force) of the occupant 14 with respect to the ground surface irrespectively of the weight of the occupant 14, and hence to absorb or reduce the impact force on an occupant 14 having a different weight (see FIG. 8). In FIG. 8, for an easier understanding of such an advantage, the effect that a change in the webbing tension angle θs caused by movement of the occupant 14 has on the acceleration α is ignored. The occupant acceleration calculating means 114 also calculates a differential with respect to time of the acceleration α of the occupant 14 with respect to the ground surface. Therefore, it is possible to predict the tendency of the collision for controlling the variable load applying means 64 more appropriately thereby to restrain the occupant 14 in better conditions.

Figure 9:
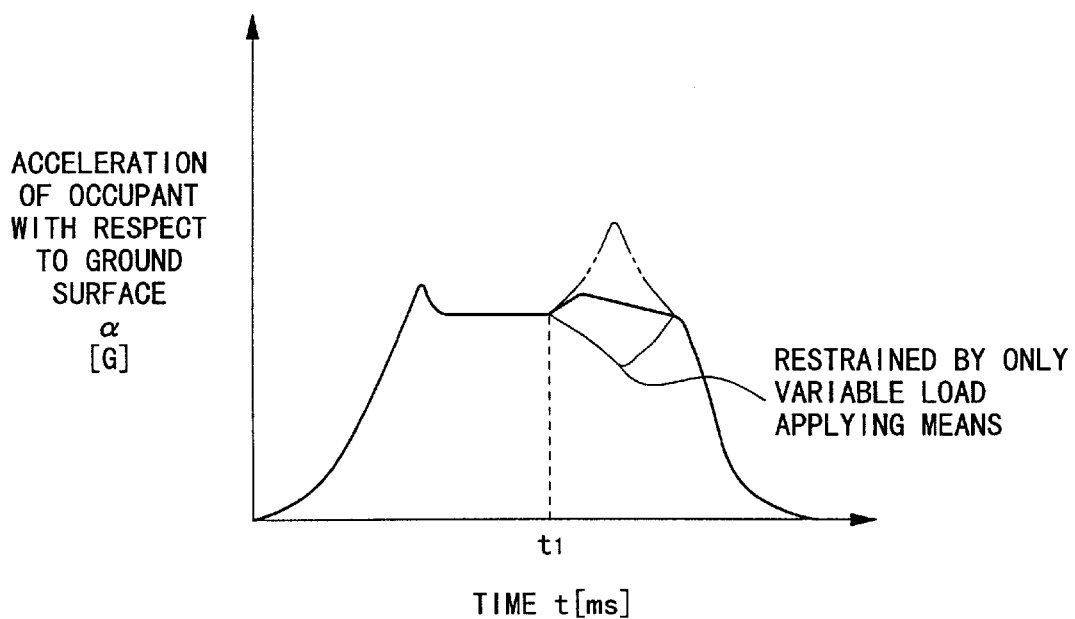
FIG. 9 is a diagram showing the relationship between the acceleration of an occupant with respect to the ground surface at the time an air bag is operated.

The steering wheel 26 has the air bag operation sensor 108 for detecting operation of the air bag 24. As shown in FIG. 9, when an air bag inflating signal is supplied from the air bag operation sensor 108 at a time $t_1$, the EA load is controlled in view of an increase in the restraint force caused by the air bag 24. Since operation of the air bag 24 is reliably detected, it is possible to cause the air bag 24 to effectively bear a restraint force to prevent the occupant 14 from moving forward for keeping the acceleration α of the occupant 14 with respect to the ground surface accurately at a constant level.

Figure 10:
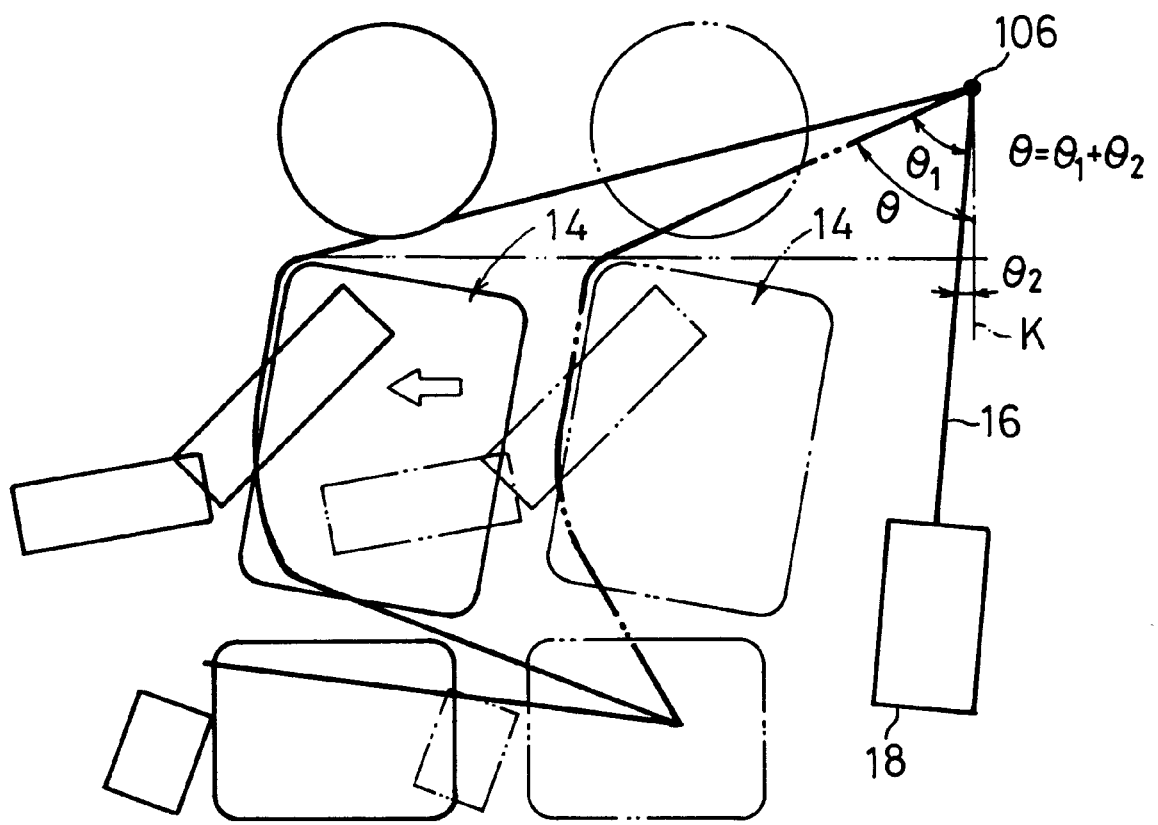
FIG. 10 is a diagram illustrative of a seat belt paid-out angle.
Figure 11:
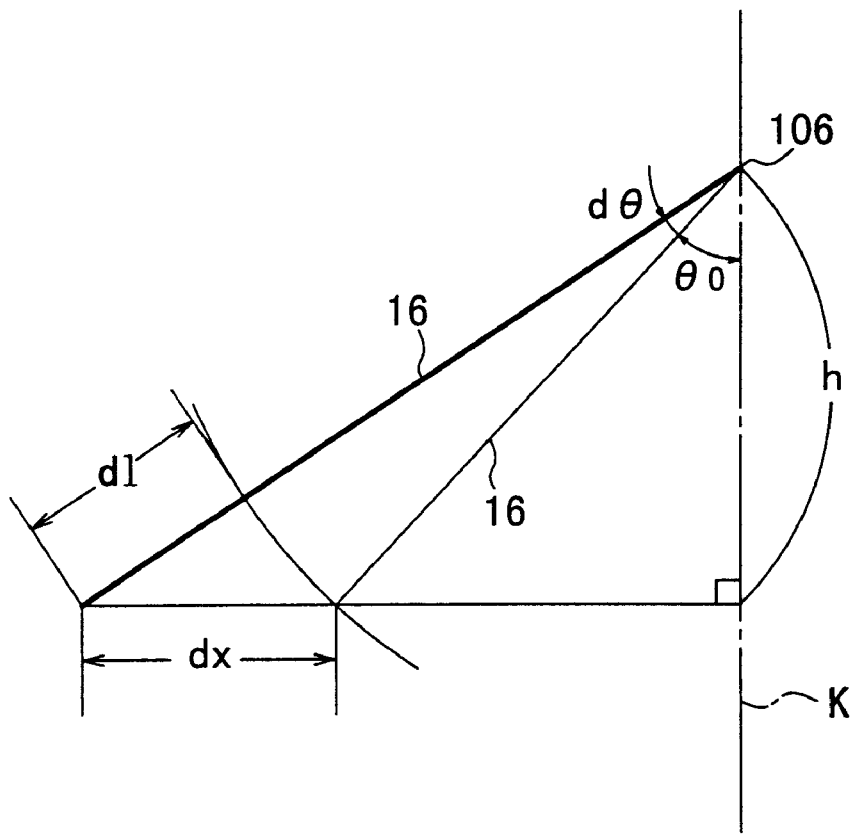
FIG. 11 is a diagram illustrative of the manner in which an amount of elongation of the seat belt is obtained from the seat belt paid-out angle.

In the first embodiment, the shoulder anchor 20 is combined with the encoder 106 for detecting a seat belt paid-out angle θ. As shown in FIG. 10, the seat belt paid-out angle θ is the sum of a displacement angle θ1 from the encoder 106 and an angle θ2 between the seat belt 16 from the ELR 18 and the normal line K. When the occupant 14 moves forward in the direction indicated by the arrow upon a collision, the seat belt paid-out angle θ increases. As the occupant 14 moves parallel to the ground surface, a paid-out length dx of the seat belt 16 in the same direction as the occupant 14 is calculated according to the following equations (see FIG. 11):

$$dx = h\{\tan(\theta_0 + d\theta) - \tan\theta_0\}$$

$$dl = \frac{h}{\cos(\theta_0 + d\theta)} - \frac{h}{\cos\theta_0}$$

$$dx = \frac{dl\{\tan(\theta_0 + d\theta) - \tan\theta_0}{\{\frac{1}{\cos(\theta_0 + d\theta)} - \frac{1}{\cos\theta_0}\}}$$

where d1 represents the paid-out length of the seat belt 16 and h the distance from the shoulder of the occupant 14 to the shoulder anchor.

Figure 12:
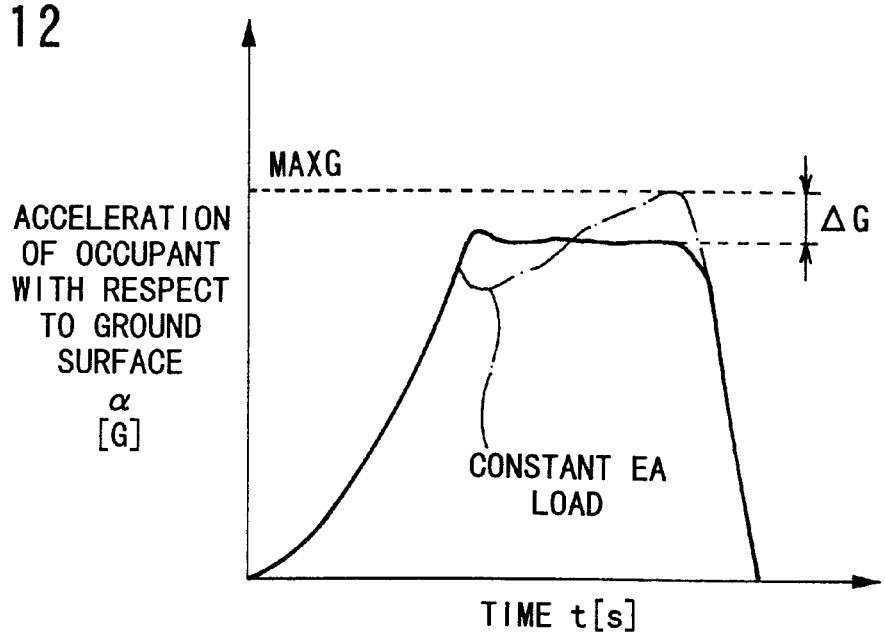
FIG. 12 is a diagram showing the acceleration of an occupant with respect to the ground surface in the case where the EA load varies and in the case where the EA load is constant.
Figure 13:
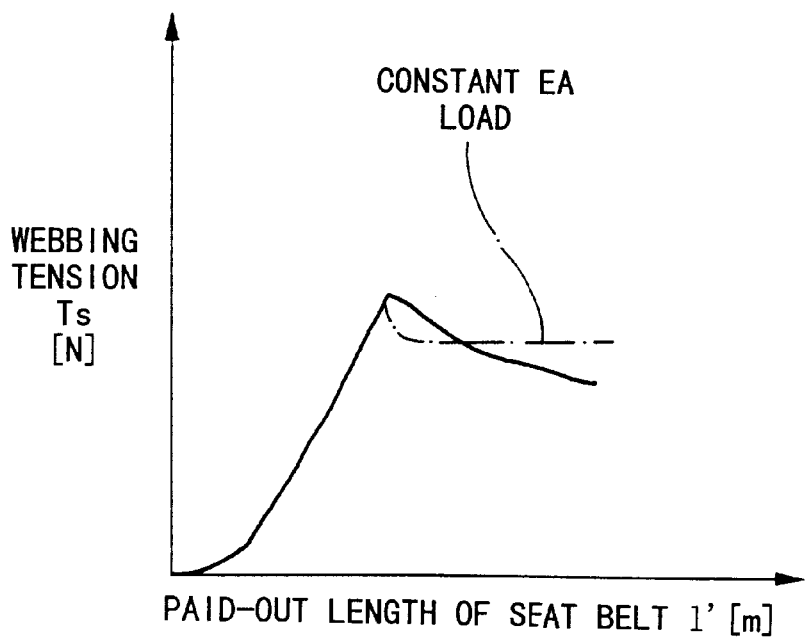
FIG. 13 is a diagram showing the webbing tension in the case where the EA load varies and in the case where the EA load is constant.

With the above equation, it is possible to calculate more highly accurately the distance by which the occupant 14 moves relatively to the vehicle upon a collision, and to more accurately estimate (calculate) the acceleration α of the occupant 14 with respect to the ground surface. Therefore, the paid-out length dl of the seat belt 16 reflects the direction of movement of the occupant 14 with respect to the vehicle, and the acceleration α of the occupant 14 with respect to the ground surface is calculated to control the EA load. Therefore, as shown in FIGS. 12 and 13, the EA load is controlled in a feedback loop based on the acceleration α of the occupant 14 with respect to the ground surface in view of the change in the webbing tension angle θs caused by movement of the occupant 14, making it possible to con control the EA load so as to be reduced progressively. Accordingly, even when the webbing tension angle θs changes to an acute angle as the occupant 14 moves, it is possible to keep constant the acceleration α of the occupant 14 with respect to the ground surface, and to effectively absorb the impact energy from an initial stage of operation of the EA mechanism, so that the maximum acceleration (impact force) acting on the occupant 14 can be reduced.

Figure 14A:
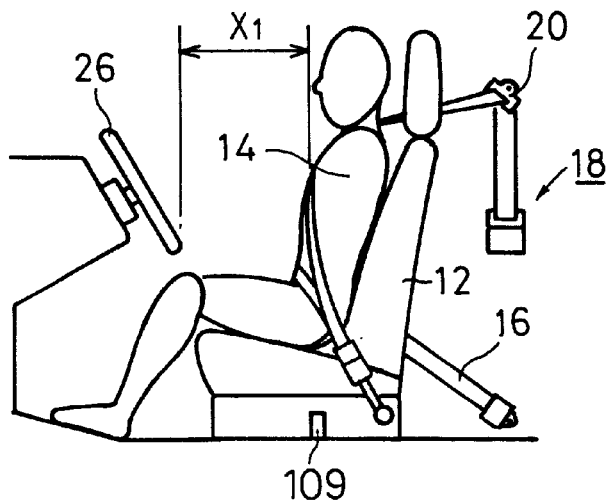
FIG. 14A is a diagram illustrative of a distance $X_1$ that an occupant can move.
Figure 14B:
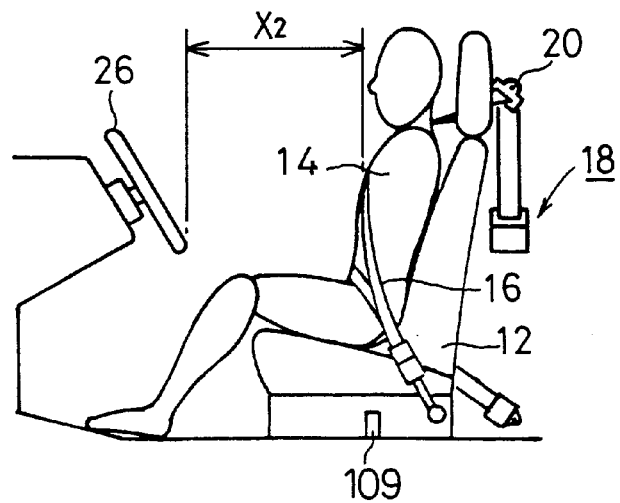
FIG. 14B is a diagram illustrative of a distance $X_2$ that an occupant can move.

In the first embodiment, the seat position detector 109 is provided for detecting the position of the occupant 14 seated on the seat 12 within the cabin of the vehicle. As shown in FIGS. 14A and 14B, the seat position detector 109 detects distances $X_1$, $X_2$ that the occupant 14 can move in the vehicle cabin, and supplies the detected distances $X_1$, $X_2$ to the control circuit 100. The control circuit 100 then varies the EA load depending on the distances $X_1$, $X_2$ that the occupant 14 can move in the vehicle cabin.

Specifically, if the occupant 14 can move a relatively large distance (distance $X_2$) in the vehicle cabin, then as shown in FIG. 15, it is possible to set the EA load to a lower level to reduce the acceleration α of the occupant 14 with respect to the ground surface, so that the load (impact) acting on the occupant 14 can effectively be reduced. In the first embodiment, the seat position detector 109 is used as an occupant position detecting means. However, a detector for detecting a paid-out length of the seat belt when the seat belt is fastened, or an ultrasonic Doppler radar or a milliwave radar to be installed on an instrumental panel for detecting the distance that an occupant has moved may be used as the occupant position detecting means.

Figure 16:
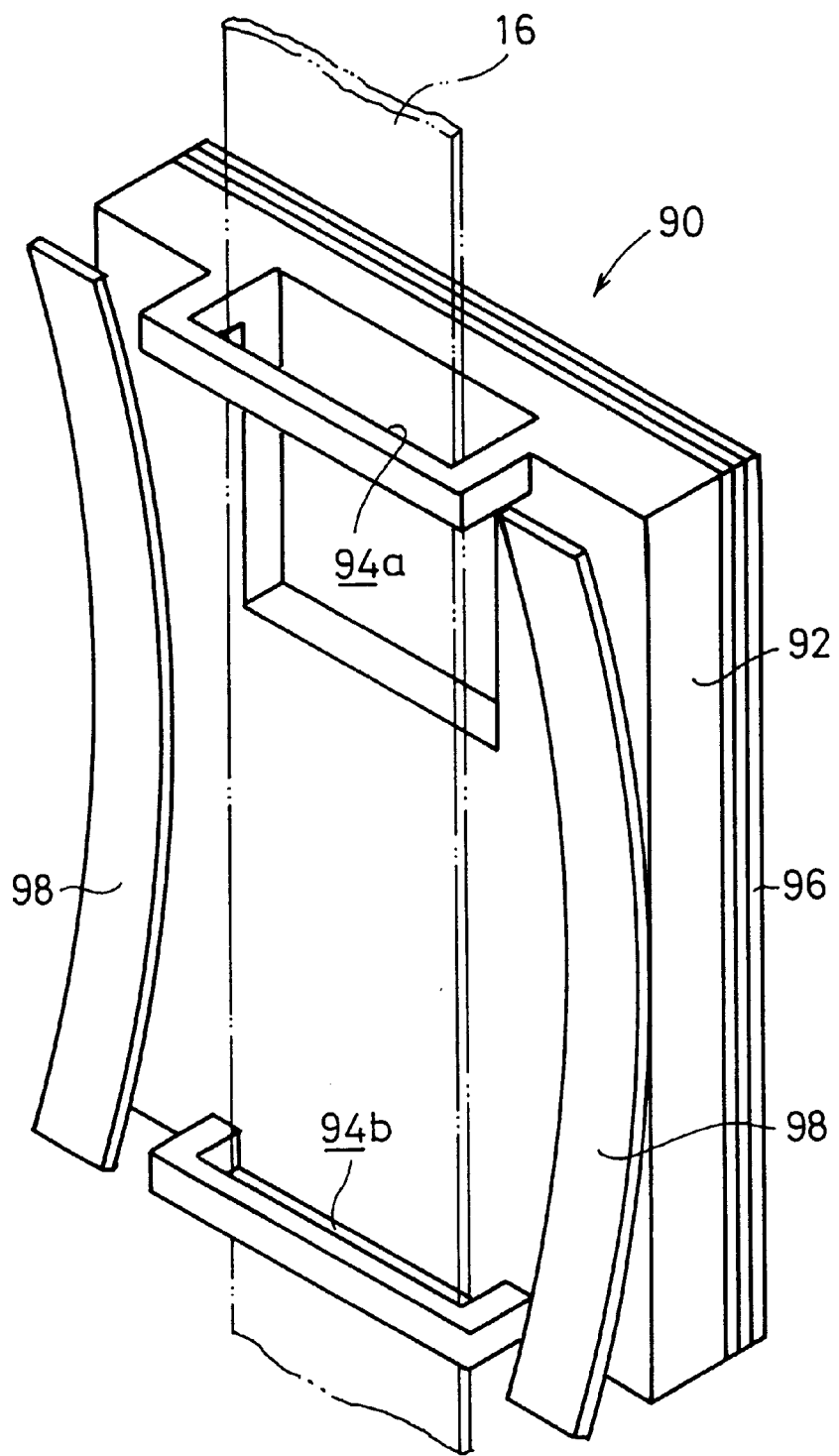
FIG. 16 is a perspective view of a clamp releasing means that can be incorporated in the ELR.

As shown in FIG. 16, a clamp releasing means 90 can be used for releasing the clamp member 42 from engagement with the seat belt 16 in order to desirably control the range in which the EA mechanism is operable. The clamp releasing means 90 has a lower plate 92 having upper and lower openings 94a, 94b through which the seat belt 16 extends. A piezoelectric device 96 is fixed to a surface of the lower plate 92 remote from the seat belt 16, and a pair of laterally spaced leaf springs 98 are mounted on an opposite surface of the lower plate 92 which faces the seat belt 16, for normally urging the lower plate 92 in a direction away from the clamp member 42.

When the piezoelectric device 96 is actuated at a desired time while the EA mechanism is in operation, the lower plate 92 pushes the seat belt 16 away from the clamp mechanism 40. The seat belt 16 is now spaced from the first and second engaging teeth 56, 58 and paid out toward the occupant 14, shortening the period of operation of the EA mechanism.

Figure 17:
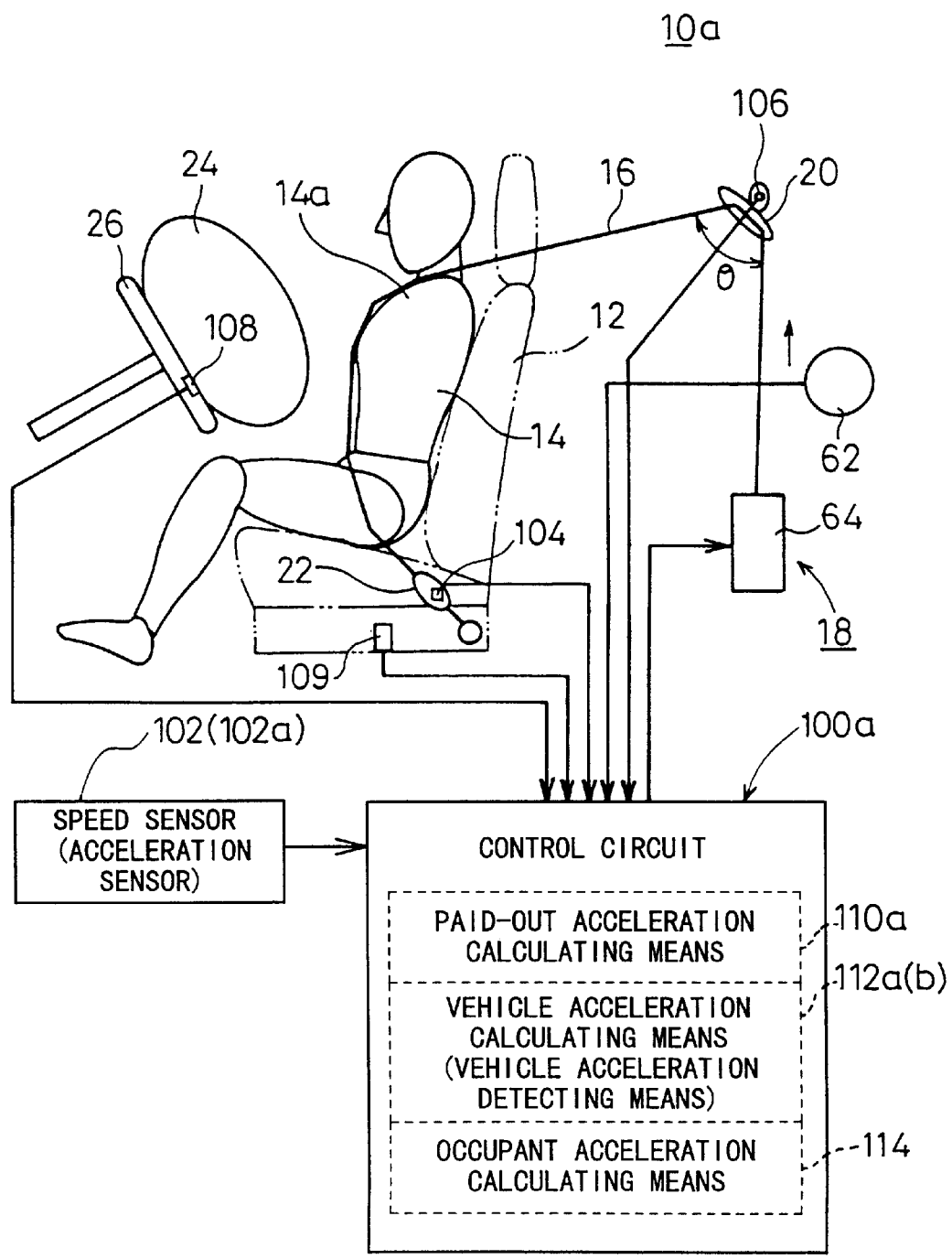
FIG. 17 is a schematic view, partly in block form, a seat belt apparatus according to a second embodiment of the present invention.

FIG. 17 schematically shows, partly in block form, a seat belt apparatus 10a as an occupant restraint apparatus according to a second embodiment of the present invention. Those parts of the seat belt apparatus 10a which are identical to those of the seat belt apparatus 10 according to the first embodiment are denoted by identical reference characters, and will not be described in detail below.

The seat belt apparatus 10a has a control circuit 100a to which a speed sensor 102 or an acceleration sensor 102a are electrically connected. The control circuit 100a functions as a paid-out acceleration calculating means 110a for calculating a paid-out acceleration of the seat belt 16 from a paid-out length of the seat belt 16, a vehicle acceleration calculating means 112a for calculating an acceleration of the vehicle with respect to the ground surface based on the speed of travel of the vehicle with respect to the ground surface detected by the speed sensor 102 or a vehicle acceleration detecting means 112b for detecting an acceleration of the vehicle with respect to the ground surface with the acceleration sensor 102a, and an occupant acceleration calculating means 114 for calculating an acceleration of the occupant 14 with respect to the ground surface from the paid-out acceleration calculated by the paid-out acceleration calculating means 110a and the acceleration of the vehicle calculated by the vehicle acceleration calculating means 112a or detected by the vehicle acceleration detecting means 112b.

Figure 18:
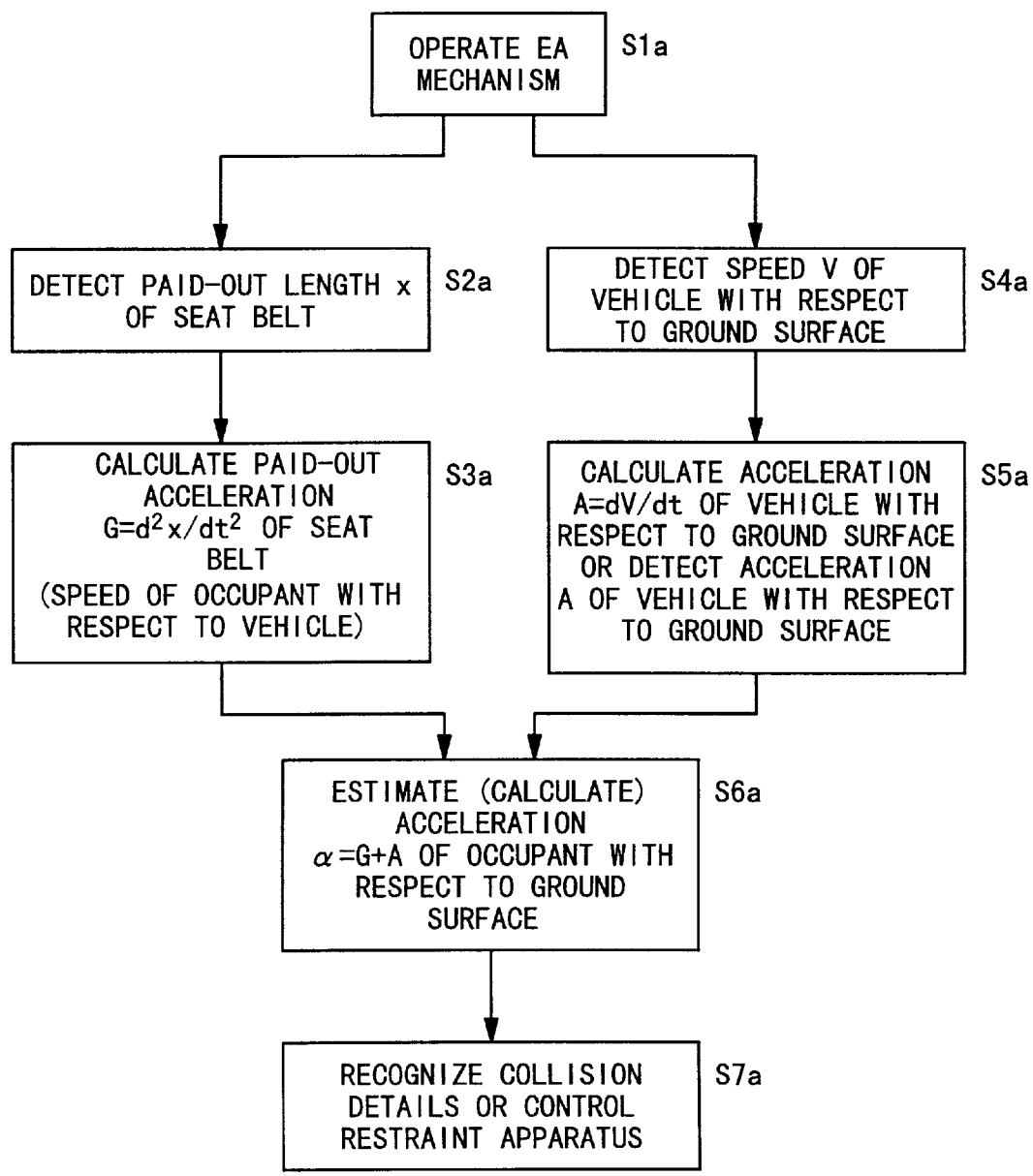
FIG. 18 is a flowchart of an operation sequence of a method of controlling the seat belt apparatus according to the second embodiment.

Operation of the seat belt apparatus 10a of the above construction will be described below with reference to FIG. 18 which shows an operation sequence of a method of controlling the seat belt apparatus 10a according to the second embodiment.

After the EA mechanism has started to operate in step S1a, a paid-out length x of the seat belt 16 is detected (step S2a), and a paid-out acceleration G ($G=d^2x/dt^2$) of the seat belt 16 is calculated (step S3a). The control circuit 100a is supplied with the vehicle speed V from the speed sensor 102 (step S4a), and the vehicle acceleration calculating means 112a calculates an acceleration A ($A=dV/dt$) of the vehicle with respect to the ground surface (step S5a). Alternatively, the control circuit 100a is supplied with the vehicle acceleration from the acceleration sensor 102a, and the vehicle acceleration detecting means 112b detects an acceleration A of the vehicle with respect to the ground surface. If the acceleration A is directly detected by the acceleration sensor 102a, then step S4a is omitted. Then, control goes to step S6a in which an acceleration α ($α=G+A$) of the occupant 14 with respect to the ground surface, and the collision details are recognized or the variable load applying means 64 is controlled (step S7a).

In the second embodiment, therefore, since the acceleration α of the occupant 14 with respect to the ground surface is calculated based on the paid-out acceleration G of the seat belt 16 and the acceleration A of the vehicle with respect to the ground surface, the variable load applying means 64 varies the load imposed on the paying-out of the seat belt 16 by the clamp mechanism 40, so that the same advantages as those of the first embodiment can be achieved.

Figure 19:
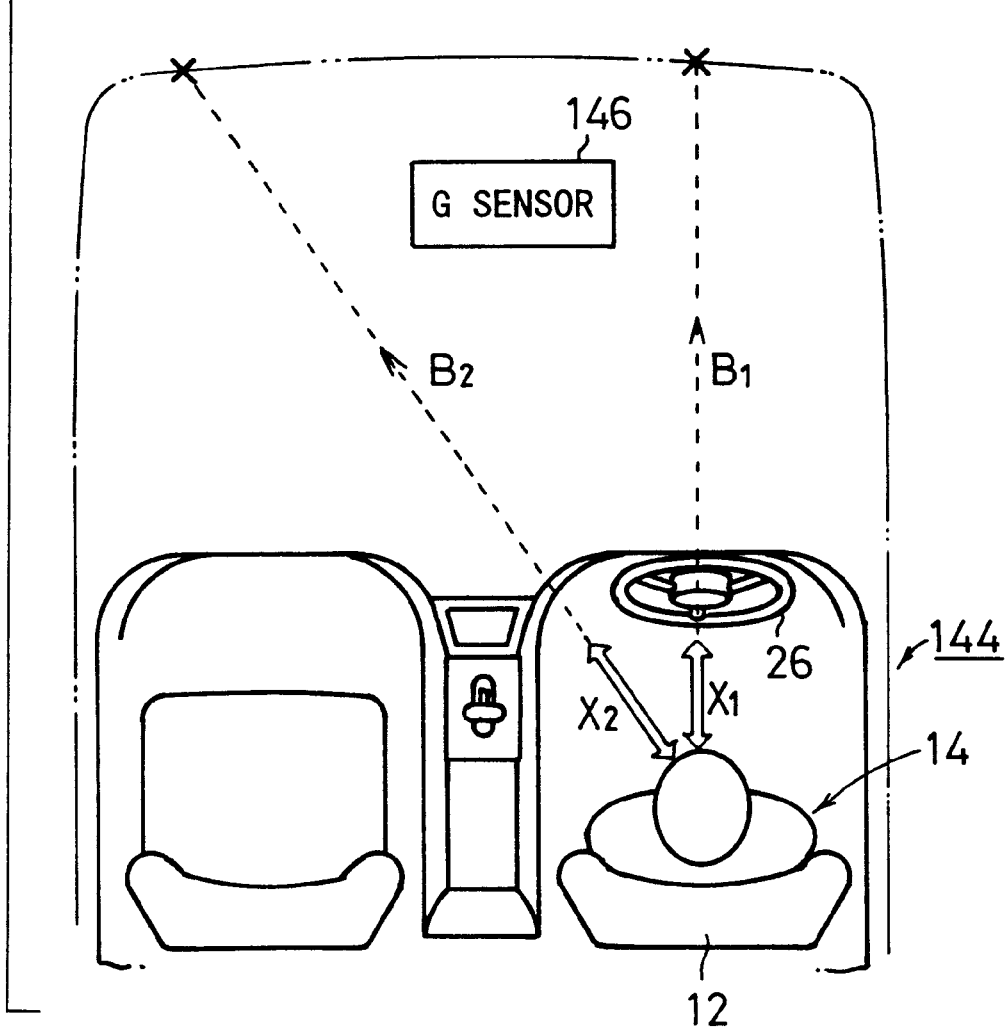
FIG. 19 is a schematic view, partly in block form, an occupant restraint apparatus according to a third embodiment of the present invention, with a G sensor incorporated therein.
Figure 20:
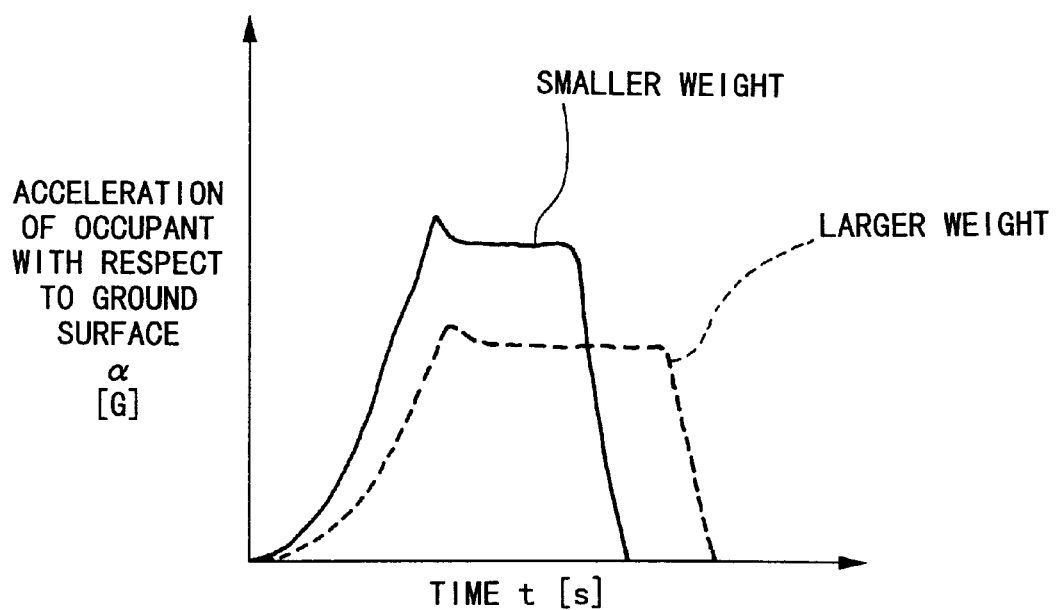
FIG. 20 is a diagram illustrative of accelerations acting on occupants having different weights.
Figure 21:
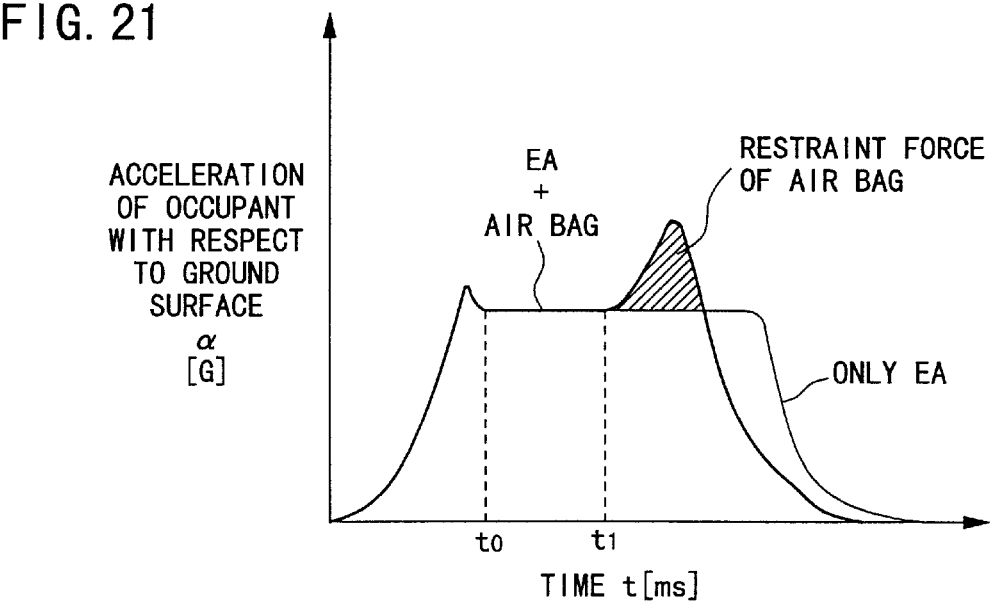
FIG. 21 is a diagram showing the acceleration of an occupant with respect to the ground surface at the time a conventional air bag is inflated.
Figure 22:
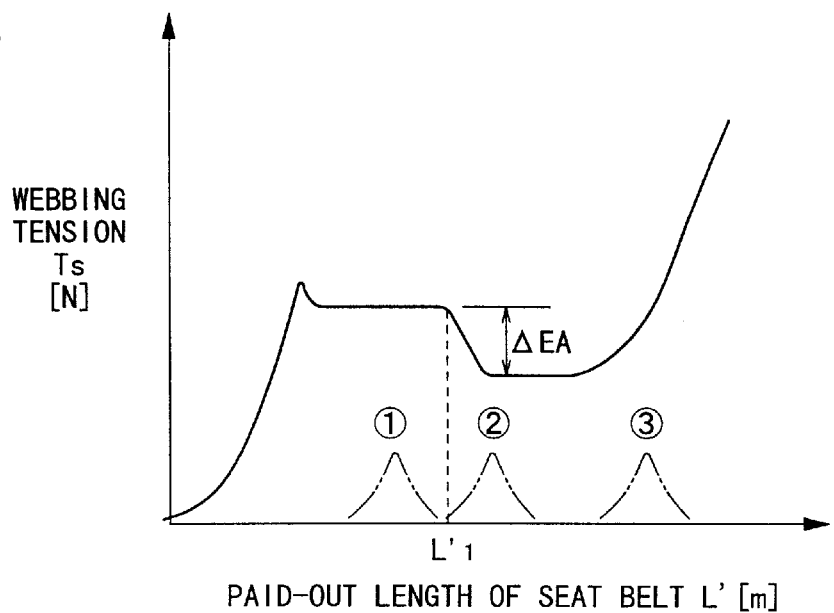
FIG. 22 is a diagram illustrative of the webbing tension at the time the EA load is controlled at two stages.
Figure 23:
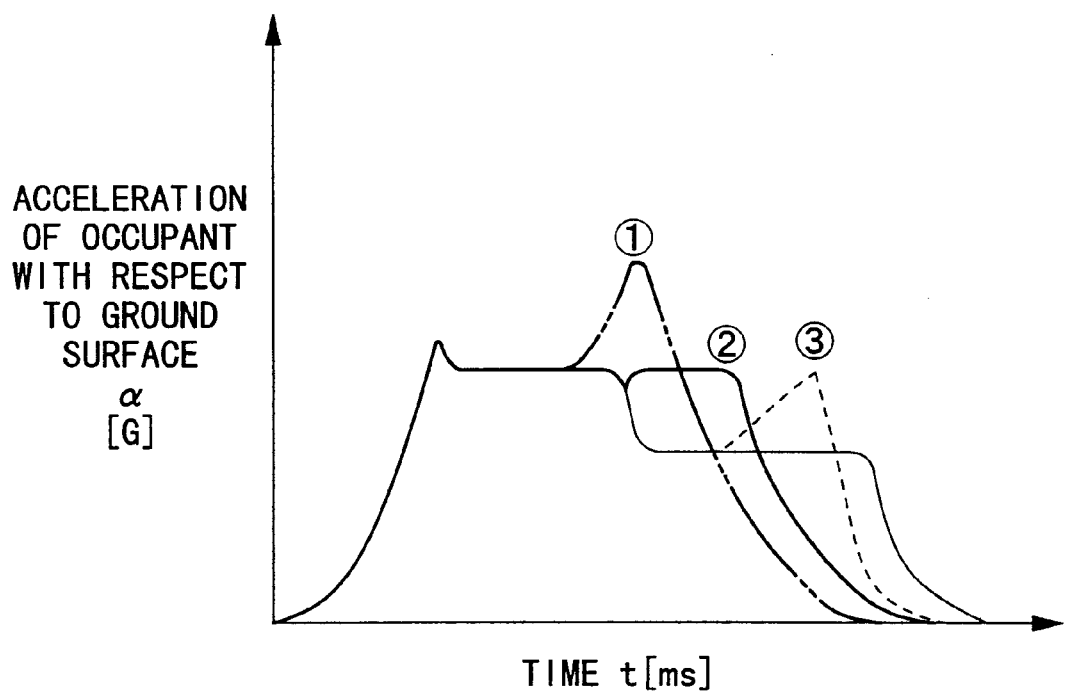
FIG. 23 is a diagram illustrative of the webbing tension at the time the air bag is inflated for different seat positions.
Figure 24:
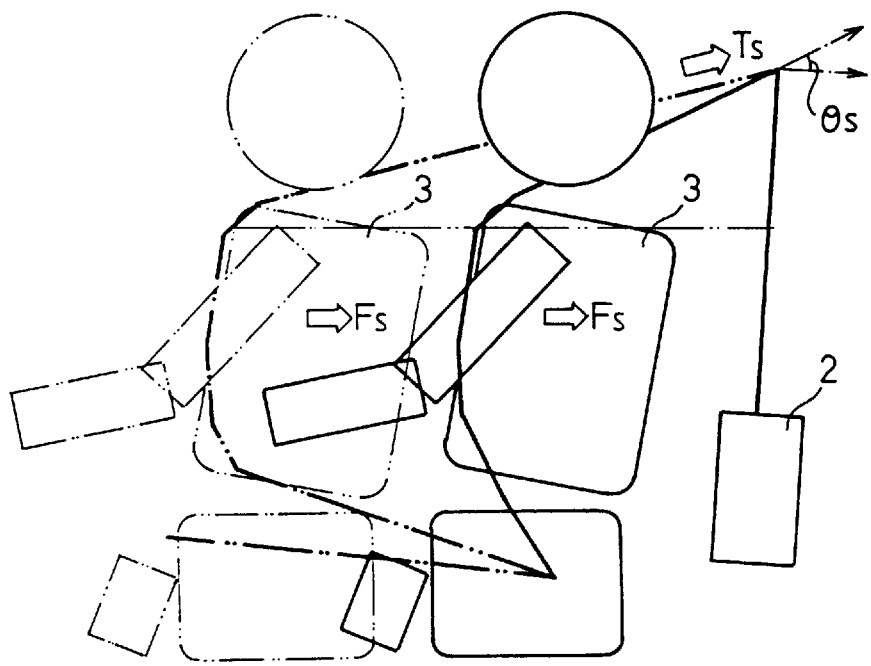
FIG. 24 is a diagram illustrative of the webbing tension and the restraint forces which act due to movement of an occupant.
Figure 25:
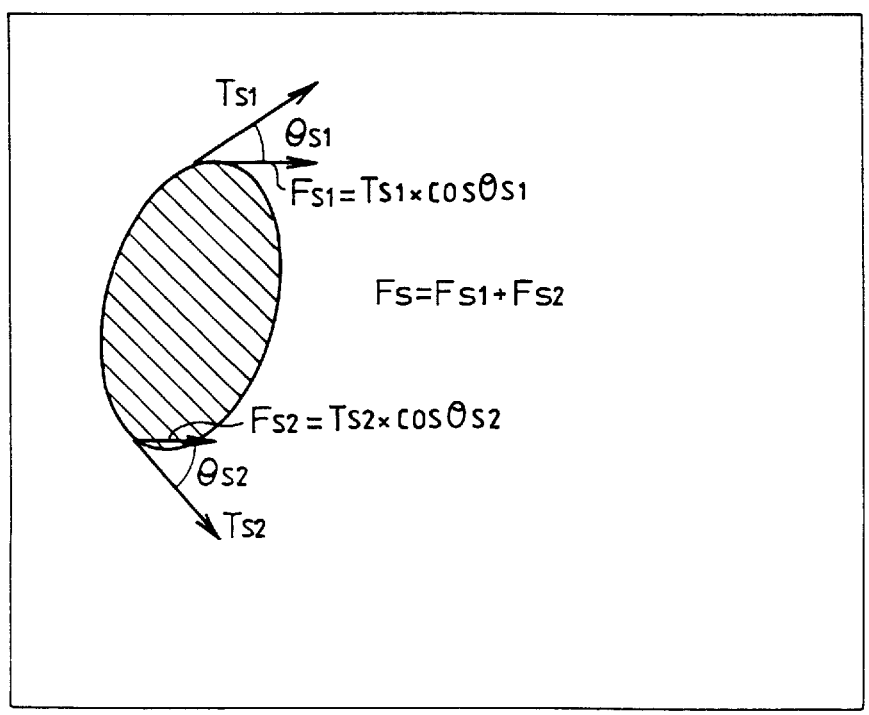
FIG. 25 is a diagram illustrative of restraint forces applied horizontally to an occupant.
Figure 26:
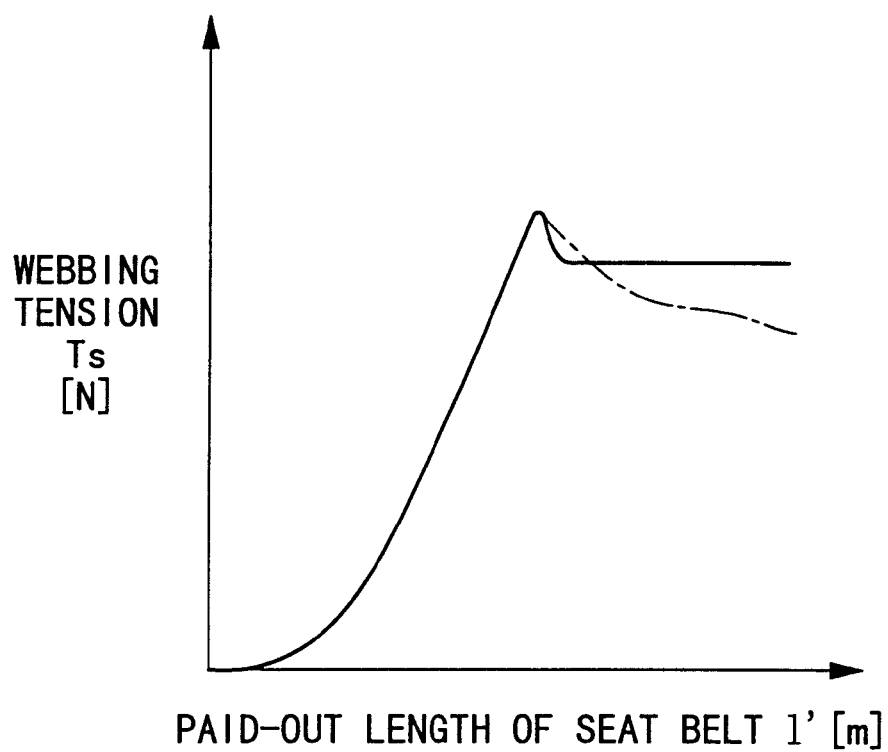
FIG. 26 is a diagram showing the general relationship between the seat belt paid-out length and the webbing tension.
Figure 27:
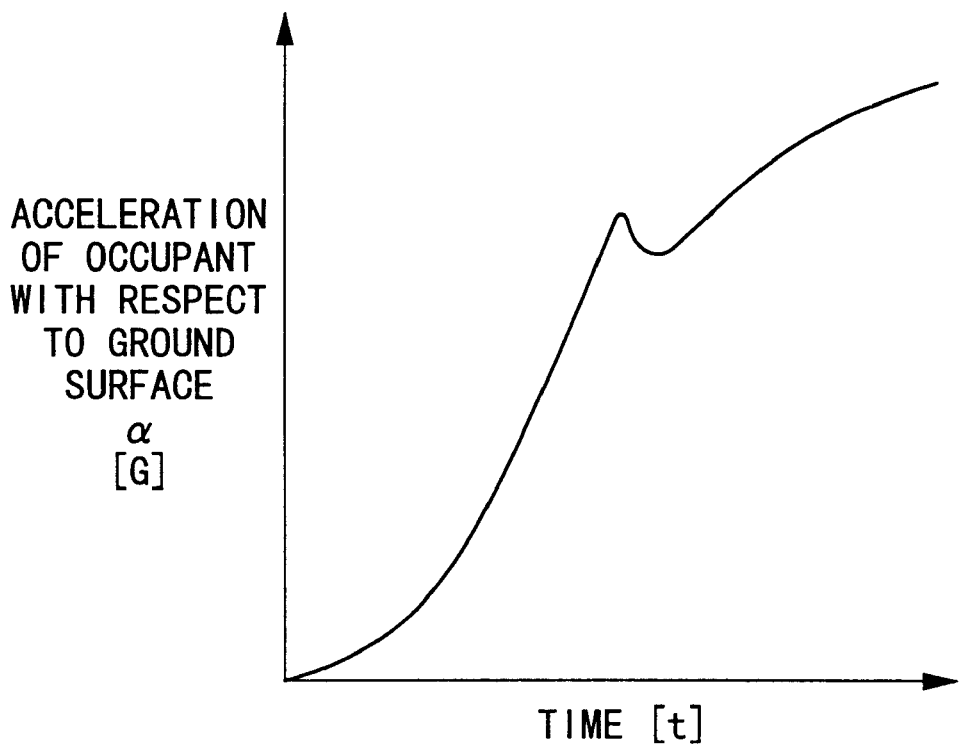
FIG. 27 is a diagram showing the general relationship between the acceleration of an occupant with respect to the ground surface and time.
Figure 28:
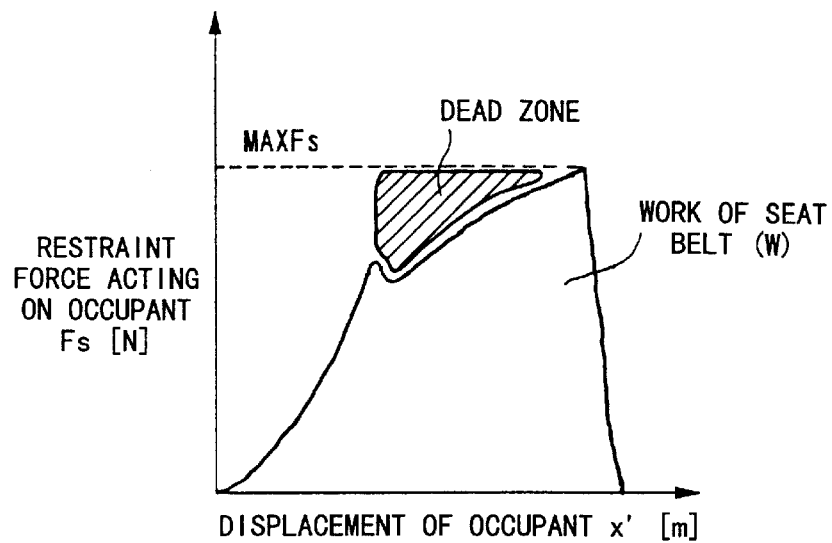
FIG. 28 is a diagram showing the relationship between the occupant's displacement and the restraint forces.
Figure 29:
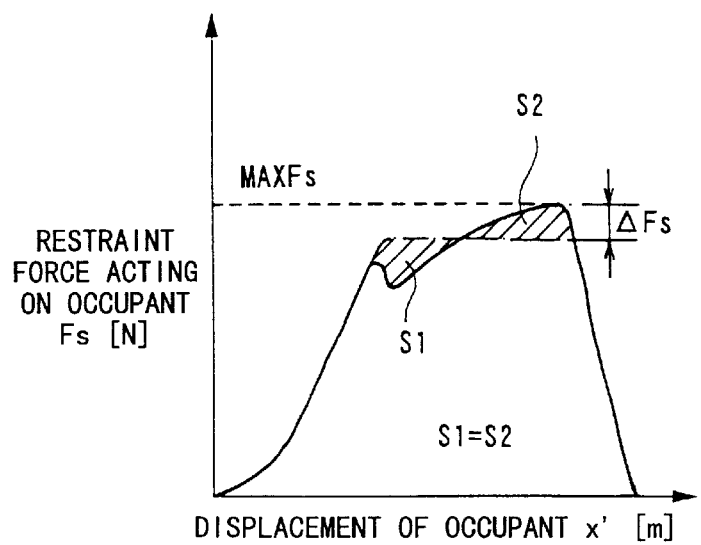
FIG. 29 is a diagram showing the relationship between the theoretical occupant's displacement and the restraint forces.

FIG. 19 schematically shows, partly in block form, an occupant restraint apparatus 144 according to a third embodiment of the present invention, with a G sensor (longitudinal and lateral acceleration detecting means) 146 incorporated therein. The G sensor 146 serves to detect accelerations of the vehicle in longitudinal and lateral directions thereof. A control circuit (not shown) serves as a moving direction determining means for determining a direction in which the vehicle collides, i.e., a direction in which the occupant 14 moves with respect to the vehicle.

Specifically, the occupant 14 moves a distance $X_1$ in a longitudinal direction (indicated by the arrow $B_1$) of the vehicle, and also moves a distance $X_2$ in an oblique direction (indicated by the arrow $B_2$), the distance $X_2$ being largely different from the distance $X_1$. By setting up an acceleration of the occupant 14 with respect to the ground surface depending on the distance $X_1$, $X_2$, the load acting on the occupant 14 can effectively be reduced.

The occupant restraint apparatus (seat belt apparatus) 10, 10a, 144 according to the first through third embodiments has the length detecting means (displacement sensor 62) for detecting a paid-out length of the seat belt 16 when the impact energy absorbing mechanism (clamp mechanism 40) is operated, the paid-out speed calculating means 110 for calculating a paid-out speed of the seat belt 16 from detected data produced by the length detecting means, the vehicle speed detecting means 112 for calculating a speed of the vehicle with respect to the ground surface, and the occupant acceleration calculating means 114 for calculating an acceleration of the occupant 14 with respect to the ground surface from the paid-out speed calculated by the paid-out speed calculating means 110 and the speed of the vehicle calculated by the vehicle speed detecting means 112.

Alternatively, the paid-out speed calculating means 110 may be replaced with the paid-out acceleration calculating means 100a for calculating a paid-out acceleration of the 103; seat belt 16, and the vehicle speed detecting means 112 may be replaced with the vehicle acceleration calculating means 112a or the vehicle acceleration detecting means 112b, and the occupant acceleration calculating means 114 may calculate an acceleration of the occupant 14 with respect to the ground surface from the paid-out acceleration calculated by the paid-out acceleration calculating means 110a and the acceleration of the vehicle calculated by the vehicle acceleration calculating means 112a or detected by the vehicle acceleration detecting means 112b.

The occupant restraint apparatus also has the angle detecting means (encoder 106) for detecting the paid-out angle θ of the seat belt which is an angle between the portion of the seat belt 16 extending from the shoulder anchor 20 toward the occupant 14 and the line normal to the ground surface. A paid-out speed or acceleration of the seat belt 16 is calculated in view of the paid-out angle θ of the seat belt detected by the angle detecting means.

The impact energy absorbing mechanism has the clamp means (clamp mechanism 40) for clamping the seat belt 16 in an emergency, and the variable load applying means 64 for varying the load imposed on the paying-out of the seat belt 16 by the clamp means based on the acceleration of the occupant 14 calculated by the occupant acceleration calculating means 114.

The occupant restraint apparatus also has the air bag operation detecting means (air bag operation sensor 108). The variable load applying means 64 varies the load imposed on the paying-out of the seat belt 16 by the clamp means based on the operation of the air bag 24 detected by the air bag operation detecting means and the acceleration of the occupant 14 calculated by the occupant acceleration calculating means 114.

The occupant restraint apparatus also has the seat position detecting means (seat position detector 109) for detecting the position of the occupant 14 seated on the seat, 12 in the longitudinal direction of the vehicle. The variable load applying means 64 varies the load imposed on the paying-out of the seat belt 16 by the clamp means in view of the position of the occupant 14 in the longitudinal direction of the vehicle.

Furthermore, the occupant restraint apparatus has the longitudinal and lateral acceleration detecting means (G sensor 146) for detecting accelerations of the occupant 14 in longitudinal and lateral directions of the vehicle in order to determine the direction in which the occupant 14 moves with respect to the vehicle. The variable load applying means 64 varies the load imposed on the paying-out of the seat belt 16 by the clamp means in view of the direction in which the occupant 14 moves with respect to the vehicle.

With the occupant restraint apparatus and the method of controlling same according to the present invention, when the impact energy absorbing mechanism is operated, a paid-out length of the seat belt is detected, and a paid-out speed or acceleration of the seat belt is calculated from the detected paid-out length of the seat belt. A speed or acceleration of the vehicle with respect to the ground surface is calculated (or detected), and an acceleration of the occupant with respect to the ground surface is calculated based on the paid-out speed or acceleration of the seat belt and the speed or acceleration of the vehicle. Then, the collision details are recognized or the occupant restraint apparatus is controlled based on the calculated acceleration of the occupant with respect to the ground surface.

Thus, the acceleration acting on the occupant with respect to the ground surface is directly calculated (estimated) based on the paid-out length of the seat belt to control the load imposed on the paying-out of the seat belt by the impact energy absorbing mechanism in a feedback loop. The acceleration acting on the occupant with respect to the ground surface can therefore be maintained at a constant level irrespectively of different occupant weights, the collision details, and whether or not an air bag is installed or not, for thereby making it possible to efficiently absorb the collision energy. Therefore, the occupant can be restrained in optimum conditions at all times.

Although certain preferred embodiments of the present invention have been shown and described in detail, it should be understood that various changes and modifications may be made therein without departing from the scope of the appended claims.

What is claimed is:

1. An occupant restraint apparatus for use on a vehicle, comprising:
    an impact energy absorbing mechanism for preventing a seat belt from being paid out to restrain an occupant in an emergency and allowing the seat belt to be paid out when a load in excess of a preset load is applied to said seat belt;
    length detecting means for detecting a paid-out length of said seat belt when said impact energy absorbing mechanism is operated;
    paid-out speed calculating means for calculating a paid-out speed of said seat belt from the paid-out length detected by said length detecting means;
    vehicle speed detecting means for detecting a speed of the vehicle with respect to a ground surface on which said vehicle runs; and
    occupant acceleration calculating means for calculating an acceleration of said occupant with respect to said ground surface based on the calculated paid-out speed and the detected speed of the vehicle.

2. An occupant restraint apparatus according to claim 1, further comprising:
    angle detecting means for detecting a paid-out angle of said seat belt;
    said paid-out speed calculating means comprising means for calculating the paid-out speed of said seat belt in view of the paid-out angle of said seat belt detected by said angle detecting means.

3. An occupant restraint apparatus according to claim 1, wherein said impact energy absorbing mechanism comprises:
    clamp means for clamping said seat belt in an emergency; and
    variable load applying means for varying the load imposed on the paying-out of said seat belt by said clamp means based on the acceleration of said occupant calculated by said occupant acceleration calculating means.

4. An occupant restraint apparatus according to claim 3, wherein said occupant acceleration calculating means comprises means for calculating a differential with respect to time of the acceleration of the occupant with respect to the ground surface.

5. An occupant restraint apparatus according to claim 3, further comprising:
    air bag operation detecting means for detecting operation of an air bag in the vehicle;
    said variable load applying means comprising means for varying the load imposed on the paying-out of said seat belt by said clamp means based on the acceleration of said occupant calculated by said occupant acceleration calculating means and the operation of the air bag detected by said air bag operation detecting means.

6. An occupant restraint apparatus according to claim 3, further comprising:
    occupant position detecting means for detecting the position of the occupant as seated in a longitudinal direction of the vehicle;

said variable load applying means comprising means for varying the load imposed on the paying-out of said seat belt by said impact energy absorbing mechanism based on the acceleration of said occupant calculated by said occupant acceleration calculating means, the paid-out length of said seat belt detected by said length detecting means, and the position of the occupant in the longitudinal direction of the vehicle detected by said occupant position detecting means.

7. An occupant restraint apparatus according to claim 3, further comprising:

longitudinal and lateral acceleration detecting means for detecting accelerations of the vehicle in longitudinal and lateral directions thereof;

movement direction determining means for determining a direction in which said occupant moves from the accelerations and directions in which the accelerations act, detected by said longitudinal and lateral acceleration detecting means;

said variable load applying means comprising means for varying the load imposed on the paying-out of said seat belt by said impact energy absorbing mechanism further in view of the direction determined by said movement direction determining means.

8. An occupant restraint apparatus for use on a vehicle, comprising:

an impact energy absorbing mechanism for preventing a seat belt from being paid out to restrain an occupant in an emergency and allowing the seat belt to be paid out when a load in excess of a preset load is applied to said seat belt;

length detecting means for detecting a paid-out length of said seat belt when said impact energy absorbing mechanism is operated;

paid-out acceleration calculating means for calculating a paid-out acceleration of said seat belt from the paid-out length detected by said length detecting means;

vehicle acceleration calculating means for detecting a speed of the vehicle with respect to a ground surface on which said vehicle runs and calculating an acceleration of the vehicle with respect to the ground surface, or vehicle acceleration detecting means for detecting an acceleration of the vehicle with respect to the ground surface; and occupant acceleration calculating means for calculating an acceleration of said occupant with respect to said ground surface based on the calculated paid-out acceleration and the calculated or detected acceleration of the vehicle.

9. An occupant restraint apparatus according to claim 8, further comprising:

angle detecting means for detecting a paid-out angle of said seat belt;

said paid-out acceleration calculating means comprising means for calculating the paid-out acceleration of said seat belt in view of the paid-out angle of said seat belt detected by said angle detecting means.

10. An occupant restraint apparatus according to claim 8, wherein said impact energy absorbing mechanism comprises:

clamp means for clamping said seat belt in an emergency; and variable load applying means for varying the load imposed on the paying-out of said seat belt by said impact energy absorbing mechanism based on the acceleration of said occupant calculated by said occupant acceleration calculating means.

11. An occupant restraint apparatus according to claim 10, wherein said occupant acceleration calculating means comprises means for calculating a differential with respect to time of the acceleration of the occupant with respect to the ground surface.

12. An occupant restraint apparatus according to claim 10, further comprising:

air bag operation detecting means for detecting operation of an air bag in the vehicle;

said variable load applying means comprising means for varying the load imposed on the paying-out of said seat belt by said impact energy absorbing mechanism based on the acceleration of said occupant calculated by said occupant acceleration calculating means and the operation of the air bag detected by said air bag operation detecting means.

13. An occupant restraint apparatus according to claim 10, further comprising:

occupant position detecting means for detecting the position of the occupant as seated in a longitudinal direction of the vehicle;

said variable load applying means comprising means for varying the load imposed on the paying-out of said seat belt by said impact energy absorbing mechanism based on the acceleration of said occupant calculated by said occupant acceleration calculating means, the paid-out length of said seat belt detected by said length detecting means, and the position of the occupant in the longitudinal direction of the vehicle detected by said occupant position detecting means.

14. An occupant restraint apparatus according to claim 10, further comprising:

longitudinal and lateral acceleration detecting means for detecting accelerations of the vehicle in longitudinal and lateral directions thereof;

movement direction determining means for determining a direction in which said occupant moves from the accelerations and directions in which the accelerations act, detected by said longitudinal and lateral acceleration detecting means;

said variable load applying means comprising means for varying the load imposed on the paying-out of said seat belt by said impact energy absorbing mechanism further in view of the direction determined by said movement direction determining means.

15. A method of controlling an occupant restraint apparatus for use on a vehicle which has an impact energy absorbing mechanism for preventing a seat belt from being paid out to restrain an occupant in an emergency and allowing the seat belt to be paid out when a load in excess of a preset load is applied to said seat belt, comprising the steps of:

detecting a paid-out length of said seat belt when said impact energy absorbing mechanism is operated;

calculating a paid-out speed of said seat belt from the detected paid-out length;

detecting a speed of the vehicle with respect to a ground surface on which said vehicle runs; and calculating an acceleration of said occupant with respect to said ground surface based on the calculated paid-out speed and the detected speed of the vehicle.

16. A method according to claim 15, further comprising the step of:

calculating the paid-out speed of said seat belt in view of a paid-out angle of said seat belt.

17. A method according to claim 15, further comprising the step of:
   calculating a differential with respect to time of the acceleration of the occupant with respect to the ground surface.

18. A method according to claim 15, further comprising the steps of:
   detecting operation of an air bag in the vehicle; and
   varying the load imposed on the paying-out of said seat belt by said impact energy absorbing mechanism with variable load applying means based on the calculated acceleration of said occupant and the detected operation of the air bag.

19. A method according to claim 15, further comprising the steps of:
   detecting the position of the occupant as seated in a longitudinal direction of the vehicle;
   varying the load imposed on the paying-out of said seat belt by said impact energy absorbing mechanism with variable load applying means based on the calculated acceleration of said occupant, the detected paid-out length of said seat belt, and the detected position of the occupant in the longitudinal direction of the vehicle.

20. A method according to claim 15, further comprising the steps of:
   detecting accelerations of the vehicle in longitudinal and lateral directions thereof;
   determining a direction in which said occupant moves from the detected accelerations and directions in which the accelerations act;
   varying the load imposed on the paying-out of said seat belt by said impact energy absorbing mechanism with variable load applying means further in view of the determined direction.

21. A method of controlling an occupant restraint apparatus for use on a vehicle which has an impact energy absorbing mechanism for preventing a seat belt from being paid out to restrain an occupant in an emergency and allowing the seat belt to be paid out when a load in excess of a preset load is applied to said seat belt, comprising the steps of:
   detecting a paid-out length of said seat belt when said impact energy absorbing mechanism is operated;
   calculating a paid-out acceleration of said seat belt from the detected paid-out length;
   detecting a speed of the vehicle with respect to a ground surface on which said vehicle runs and calculating an acceleration of the vehicle with respect to the ground surface, or detecting an acceleration of the vehicle with respect to the ground surface; and
   calculating an acceleration of said occupant with respect to said ground surface based on the calculated paid-out acceleration and the calculated or detected acceleration of the vehicle.

22. A method according to claim 21, further comprising the step of:
   calculating the paid-out acceleration of said seat belt in view of a paid-out angle of said seat belt.

23. A method according to claim 21, further comprising the step of:
   calculating a differential with respect to time of the acceleration of the occupant with respect to the ground surface.

24. A method according to claim 21, further comprising the steps of:
   detecting operation of an air bag in the vehicle; and
   varying the load imposed on the paying-out of said seat belt by said impact energy absorbing mechanism with variable load applying means based on the calculated acceleration of said occupant and the detected operation of the air bag.

25. A method according to claim 21, further comprising the steps of:
   detecting the position of the occupant as seated in a longitudinal direction of the vehicle;
   varying the load imposed on the paying-out of said seat belt by said impact energy absorbing mechanism with variable load applying means based on the calculated acceleration of said occupant, the detected paid-out length of said seat belt, and the detected position of the occupant in the longitudinal direction of the vehicle.

26. A method according to claim 21, further comprising the steps of:
   detecting accelerations of the vehicle in longitudinal and lateral directions thereof;
   determining a direction in which said occupant moves from the detected accelerations and directions in which the accelerations act;
   varying the load imposed on the paying-out of said seat belt by said impact energy absorbing mechanism with variable load applying means further in view of the determined direction.

* * * * *